(12) United States Patent
Takeuchi et al.

(10) Patent No.: US 12,414,182 B2
(45) Date of Patent: Sep. 9, 2025

(54) COMMUNICATION TERMINAL DEVICE, COMMUNICATION METHOD AND COMMUNICATION PROGRAM PRODUCT

(71) Applicant: DENSO CORPORATION, Kariya (JP)

(72) Inventors: Takashi Takeuchi, Kariya (JP); Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 610 days.

(21) Appl. No.: 17/747,324

(22) Filed: May 18, 2022

(65) Prior Publication Data

US 2022/0279616 A1 Sep. 1, 2022

Related U.S. Application Data

(63) Continuation of application No. PCT/JP2020/035030, filed on Sep. 16, 2020.

(30) Foreign Application Priority Data

Nov. 20, 2019 (JP) .................................. 2019-209682

(51) Int. Cl.
*H04B 7/204* (2006.01)
*H04W 4/40* (2018.01)
*H04W 12/06* (2021.01)
*H04W 76/16* (2018.01)
*H04W 84/12* (2009.01)

(52) U.S. Cl.
CPC ............. *H04W 76/16* (2018.02); *H04W 4/40* (2018.02); *H04W 12/06* (2013.01); *H04W 84/12* (2013.01)

(58) Field of Classification Search
CPC ....... H04W 76/16; H04W 4/40; H04W 12/06; H04W 84/12; H04W 4/80; H04W 12/069; H04W 88/06; H04W 4/46
USPC ........................................................ 370/319
See application file for complete search history.

(56) References Cited

U.S. PATENT DOCUMENTS

| | | | |
|---|---|---|---|
| 6,791,473 B2* | 9/2004 | Kibria ...................... | G08G 1/14 705/13 |
| 6,944,299 B1* | 9/2005 | Mallela ............ | H04N 21/43637 713/168 |
| 8,588,691 B2* | 11/2013 | Wakasa ................... | H04L 67/04 455/504 |
| 9,277,066 B2* | 3/2016 | Naruse ............. | H04N 21/43615 |

(Continued)

FOREIGN PATENT DOCUMENTS

| | | |
|---|---|---|
| CN | 103856527 A | 6/2014 |
| EP | 3107347 A1 | 12/2016 |

(Continued)

*Primary Examiner* — Amancio Gonzalez
(74) *Attorney, Agent, or Firm* — Harness, Dickey & Pierce, P.L.C.

(57) ABSTRACT

A communication terminal device includes a first communication unit that is configured to communicate with another communication terminal device by a first communication method; and a second communication unit that is configured to communicate with the other communication terminal device by a second communication method that is different from the first communication method. The first communication unit is configured to exchange connection information necessary for the second communication unit to start communication with the other communication terminal device before the second communication unit starts the communication.

15 Claims, 19 Drawing Sheets

(56) References Cited

U.S. PATENT DOCUMENTS

| | | | |
|---|---|---|---|
| 9,419,672 B2* | 8/2016 | Misumi | H04B 1/1027 |
| 9,516,596 B2* | 12/2016 | Kusakabe | H04W 52/0229 |
| 9,635,491 B2* | 4/2017 | Bar | H04W 12/04 |
| 9,723,650 B2* | 8/2017 | Hamada | H04W 76/23 |
| 9,769,686 B2* | 9/2017 | Kang | H04L 69/18 |
| 9,787,726 B2* | 10/2017 | Russell | H04L 65/1095 |
| 9,921,789 B2* | 3/2018 | Adachi | G06F 3/1222 |
| 10,346,108 B2* | 7/2019 | Nonoyama | G06F 3/1204 |
| 10,372,392 B2* | 8/2019 | Hirai | G06F 3/1285 |
| 10,397,963 B2* | 8/2019 | Ito | H04W 88/06 |
| 10,609,738 B2* | 3/2020 | Yoshikawa | G06Q 20/325 |
| 10,614,270 B2* | 4/2020 | Morimoto | H04W 76/11 |
| 10,638,396 B2* | 4/2020 | Shimoji | H04W 36/34 |
| 10,735,518 B2* | 8/2020 | Magalhães de Matos | H04W 40/026 |
| 10,805,287 B2* | 10/2020 | Jung | H04L 63/0853 |
| 10,812,147 B2* | 10/2020 | Fujii | H04B 5/26 |
| 10,848,633 B2* | 11/2020 | Nishida | H04N 1/00901 |
| 10,951,443 B2* | 3/2021 | Nakano | H04B 5/48 |
| 11,119,714 B2* | 9/2021 | Okigami | G06F 3/1231 |
| 11,909,547 B2* | 2/2024 | Shribman | H04L 12/4633 |
| 2011/0124286 A1 | 5/2011 | Tanaka et al. | |
| 2012/0034876 A1 | 2/2012 | Nakamura et al. | |
| 2014/0320909 A1* | 10/2014 | Shimazaki | H04W 8/005 358/1.15 |
| 2014/0340701 A1* | 11/2014 | Okamura | G06F 3/121 358/1.14 |
| 2016/0345254 A1 | 11/2016 | Iwami et al. | |
| 2017/0150388 A1* | 5/2017 | Wen | H04L 5/00 |
| 2017/0201875 A1 | 7/2017 | Lee | |
| 2017/0238356 A1 | 8/2017 | Yamazaki et al. | |
| 2017/0353920 A1 | 12/2017 | Iwami et al. | |
| 2018/0310239 A1 | 10/2018 | Iwami et al. | |
| 2019/0053149 A1 | 2/2019 | Iwami et al. | |
| 2020/0186641 A1* | 6/2020 | Ma | G06F 3/017 |

FOREIGN PATENT DOCUMENTS

| | | |
|---|---|---|
| JP | 2012037940 A | 2/2012 |
| JP | 2013167510 A | 8/2013 |
| JP | 5921246 B2 | 5/2016 |
| JP | 2018502353 A | 1/2018 |
| WO | WO-2010041366 A1 | 4/2010 |
| WO | WO-2014/087229 A2 | 6/2014 |
| WO | WO-2016060217 A1 | 4/2016 |

* cited by examiner

FIG. 2
(a)
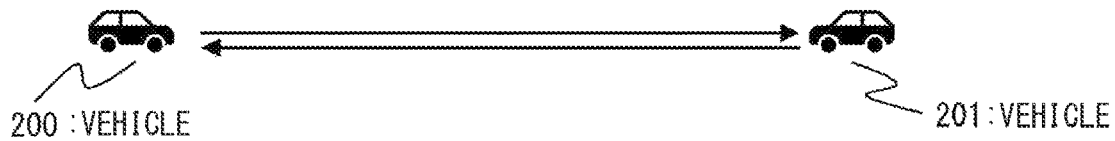
(b)
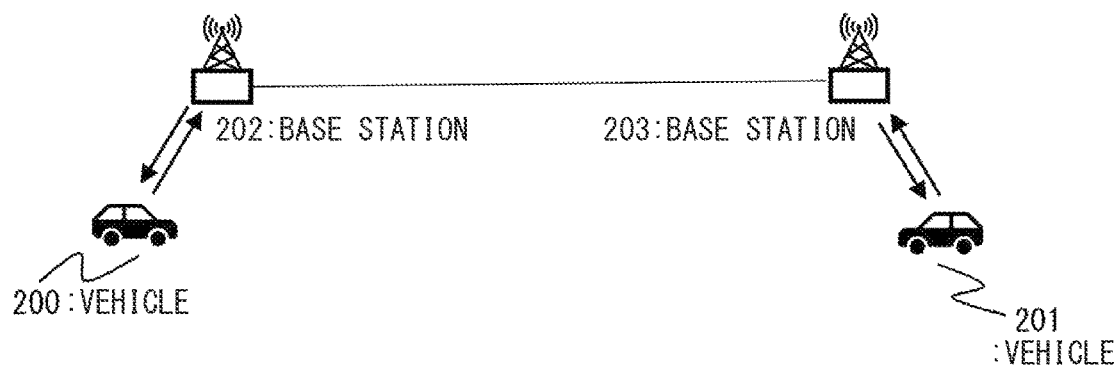
(c)
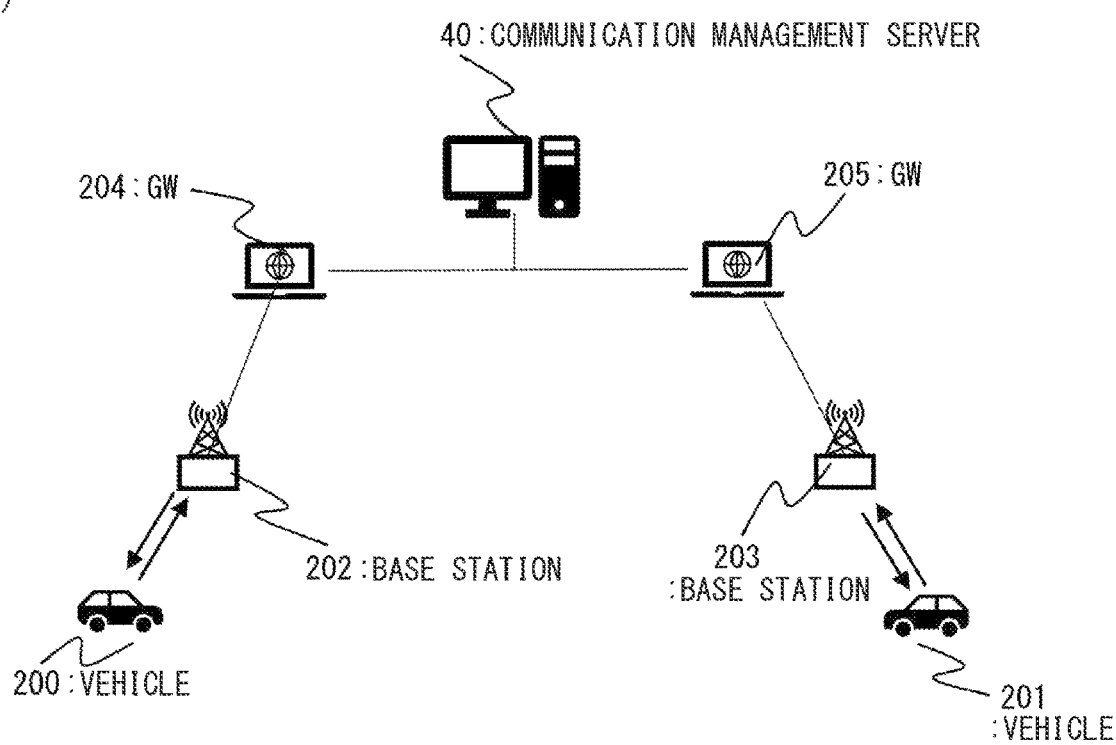

FIG. 9
(A)
(B)
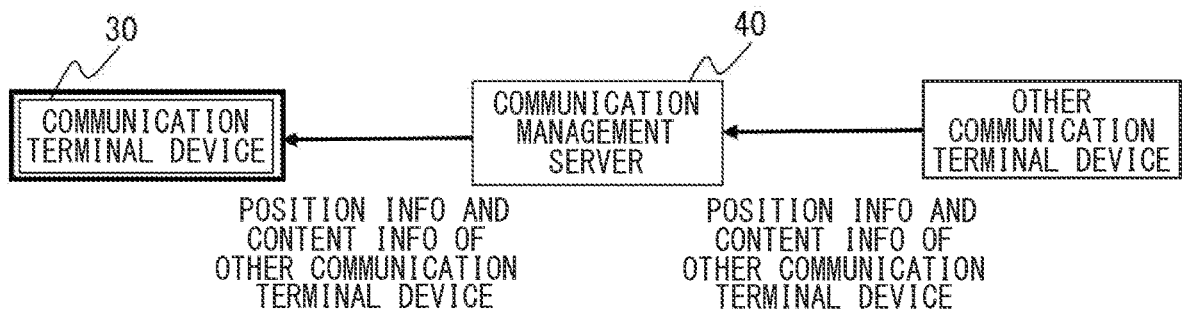
(C)
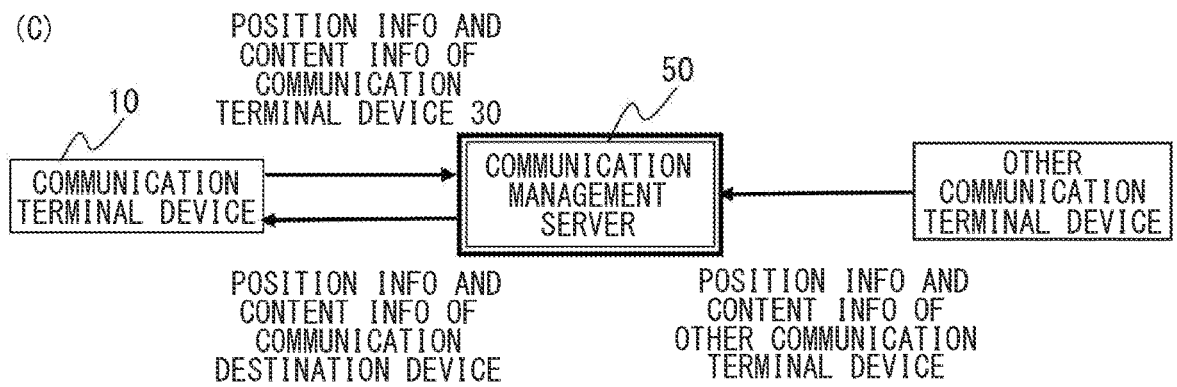

FIG. 12

| VEHICLE ID | POSITION INFO | | | ROAD INFO | MEASUREMENT TIME AND DATE | CONTENT INFO | | |
|---|---|---|---|---|---|---|---|---|
| | ABSOLUTE POSITION | VELOCITIES | | | | CONTENTS | SIZE | UPDATE TIME AND DATE |
| VEHICLE 201 | (X1,Y1,Z1) | (Vx1,Vy1,Vz1) | | route10 | Y1:M1:D1:H1:M1:S1 | LOCAL MAP INFO A | ***** | Y1:M1:D1:H1:M1:S1 |
| VEHICLE 207 | (X2,Y2,Z2) | (Vx2,Vy2,Vz2) | | route20 | Y2:M2:D2:H2:M2:S2 | LOCAL MAP INFO B | ****** | Y2:M2:D2:H2:M2:S2 |
| VEHICLE 208 | (X3,Y3,Z3) | (Vx3,Vy3,Vz3) | | route10 | Y3:M3:D3:H3:M3:S3 | CONGESTION INFO | ** | Y3:M3:D3:H3:M3:S3 |

COMMUNICATION TERMINAL DEVICE, COMMUNICATION METHOD AND COMMUNICATION PROGRAM PRODUCT

CROSS REFERENCE TO RELATED APPLICATIONS

This application is a continuation application of International Patent Application No. PCT/JP2020/035030 filed on Sep. 16, 2020, which designated the U.S. and claims the benefit of priority from Japanese Patent Application No. 2019-209682 filed on Nov. 20, 2019. The entire disclosure of all of the above application is incorporated herein by reference.

TECHNICAL FIELD

The present disclosure relates to a communication terminal device, a communication method, and a communication program product that perform communication under an environment where a relative distance between the communication terminal device and another communication terminal device is changeable.

BACKGROUND

When communication such as vehicle-to-vehicle communication or road-to-vehicle communication is performed in a state in which an own communication terminal device or a communication terminal device of a communication target is mounted in a mobile body such as a vehicle, various data can be exchanged using wireless communication even in an environment in which a relative distance to the communication terminal device of the destination may change during the communication.

Particularly, in short-distance communication, by directly performing wireless communication between such communication terminal devices as described above, communication with a relatively wide band and low communication cost is possible, and a larger amount of content data can be exchanged. However, generally, a distance within which communication is possible is limited in such short-distance communication as described above. In a situation where a relative distance between communication terminal devices may change, there is a limit on a period of time when communication is possible.

A technique for efficiently using a period of time when communication is possible even when the period of time when communication is possible is relatively short is known.

In a typical communication method, before short-distance communication is started, processing is executed to exchange position/movement information, which relates to the position and movement state of an own device and includes the current position detected by a position detection unit, with another device by long-distance communication, and a period of time when short-distance communication with the other device is available and a section where the short-distance communication with the other device is available are estimated from the position/movement information of the own device and position/movement information of the other device. By performing the estimation, it is possible to efficiently start the short-distance communication promptly after the short-distance communication becomes available.

SUMMARY

According to one aspect of the present disclosure, a communication terminal device includes: a first communication unit that is configured to communicate with another communication terminal device by a first communication method; and a second communication unit that is configured to communicate with the other communication terminal device by a second communication method that is different from the first communication method. The first communication unit is configured to exchange connection information necessary for the second communication unit to start communication with the other communication terminal device before the second communication unit starts the communication. The second communication method is a wireless LAN.

BRIEF DESCRIPTION OF DRAWINGS

FIG. 2 is an explanatory diagram describing communication via a first communication method by the communication terminal device according to the first embodiment of the present disclosure.

FIG. 9 is an explanatory diagram describing three variations relating to communication target identification according to a second embodiment of the present disclosure.

FIG. 12 is an explanatory diagram describing an example of position information and content information stored in the communication terminal device according to the 2A embodiment of the present disclosure.

DESCRIPTION OF EMBODIMENTS

Figure 1:
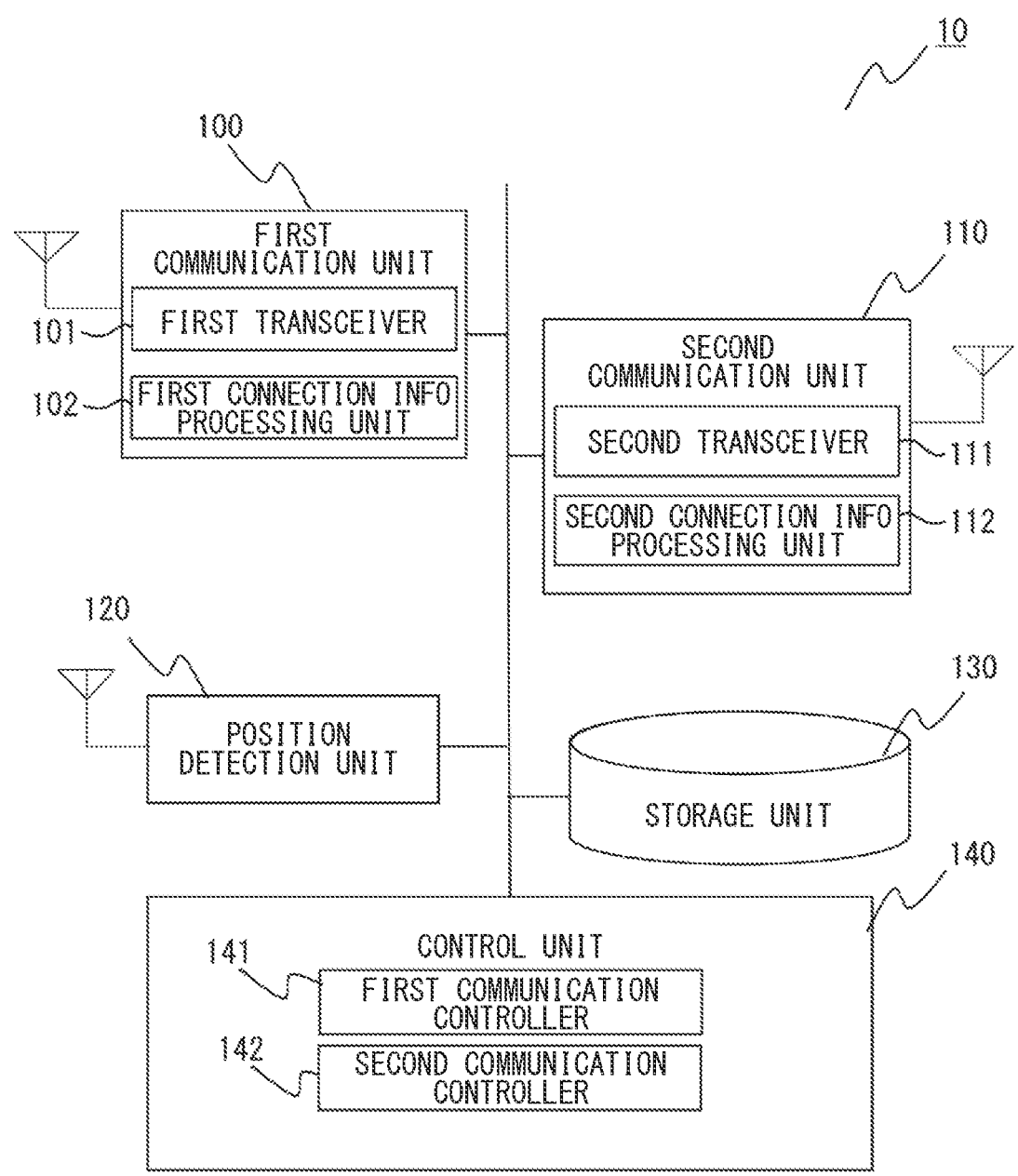
FIG. 1 is a block diagram illustrating a configuration example of a communication terminal device according to a first embodiment of the present disclosure.

To begin with, a relevant technology will be described first only for understanding the following embodiments.

The present inventors found the following problems.

In a case where short-distance communication is performed in an environment in which a relative distance between communication terminal devices may change, even when the short-distance communication can be started in a timely manner by estimating a period of time when the short-distance communication is available and a section where the short-distance communication is available, after the short-distance communication becomes physically connectable, it is necessary to exchange connection information necessary for communication and prepare connection before the execution of actual data communication for, for example, an authentication process, a connection process, an IP address acquisition process, and the like and to prepare connection, and this limits a period of time when communication is possible.

According to one aspect of the present disclosure, a communication terminal device includes: a first communication unit that is configured to communicate with another communication terminal device by a first communication method; and a second communication unit that is configured to communicate with the other communication terminal device by a second communication method that is different from the first communication method, wherein the first communication unit is configured to exchange connection information necessary for the second communication unit to start communication with the other communication terminal device before the second communication unit starts the communication. The second communication method is a wireless LAN.

According to another aspect of the present disclosure, a communication method includes the steps of: starting communication with another communication terminal device by a first communication method; exchanging, by the first communication method, connection information necessary to start communication by a second communication method that is different from the first communication method; and performing connection information processing using the connection information and starting communication with the other communication terminal device by the second communication method. The second communication method is a wireless LAN.

According to yet another aspect of the present disclosure, a communication program product executed by a communication terminal device comprises instructions, when executed by the communication terminal device, causing the communication terminal device to: start communication with another communication terminal device by a first communication method; exchange, by the first communication method, connection information necessary to start communication by a second communication method that is different from the first communication method; and perform connection information processing using the connection information and start the communication with the other communication terminal device by the second communication method. The second communication method is a wireless LAN.

With the configuration described above, connection information, which is information necessary for starting communication via a second communication method, is exchanged in advance via a first communication method different from the second communication method, and thus a communication time period is not unnecessarily reduced and it is possible to effectively use the communication time period via the second communication method.

Hereinafter, embodiments of the present disclosure are described with reference to the drawings.

The present invention described below means the invention described in the claims and is not limited to the following embodiments. In addition, at least words in double quotations mean words described in the claims and are also not limited to the following embodiments.

Configurations and methods described in dependent claims included in the claims are arbitrary configurations and methods in the invention described in independent claims included in the claims. Configurations and methods of embodiments corresponding to the configurations and methods described in the dependent claims and configurations and methods described only in the embodiments and not described in the claims are arbitrary configurations and methods in the present invention. Configurations and methods described in the embodiments in a case where the description of the claims is broader than the description of the embodiments are also arbitrary configurations and methods in the present invention in the sense that the configurations and methods described in the embodiments in the case are examples of the configurations and methods of the present invention. In any of the cases, they become essential configurations and methods of the present invention by describing them in the independent claims of the claims.

Effects described in the embodiments are effects obtained when configurations of the embodiments are provided as examples of the present invention, and are not necessarily effects obtained by the present invention.

When a plurality of embodiments is provided, a configuration disclosed in each embodiment is not closed only in each embodiment and can be combined across the embodiments. For example, a configuration disclosed in one embodiment may be combined with another embodiment. In addition, configurations disclosed in a plurality of embodiments may be collected and combined.

Implementation described in the present disclosure is not known, but is independently found by the present inventor, and is the fact that affirms the inventive step of the invention together with the configurations and methods of the present disclosure.

1. First Embodiment (1) Configuration of Communication Terminal Device

A configuration of a communication terminal device 10 according to a first embodiment is described with reference to FIGS. 1 to 8.

Although a vehicle equipped with the communication terminal device 10 is described below as an example, it is assumed that the vehicle equipped with the communication terminal device 10 is a vehicle 200 and a vehicle equipped with another communication terminal device is a vehicle other than the vehicle 200.

In addition, to avoid complication in the following description, for example, the fact that the communication terminal device 10 mounted on the vehicle 200 and the other communication terminal device mounted on the vehicle 201 communicate with each other may be simply described as the fact that the vehicle 200 and the vehicle 201 communicate with each other, to the extent that there is no misunderstanding. The same applies to the description of the following other embodiments.

As illustrated in FIG. 1, the communication terminal device 10 includes a first communication unit 100, a second communication unit 110, a position detection unit 120, a storage unit 130, and a control unit 140.

The communication terminal device 10 communicates with the other communication terminal device by the first communication unit 100 and the second communication unit 110. However, when the communication terminal device 10 is "mounted in a mobile body", the other communication terminal device may be mounted in a mobile body or may be mounted on a "fixed object".

In addition, the communication terminal device 10 may be mounted in a "fixed object". In this case, the other communication terminal device is mounted on a "mobile body".

That is, either one or both of the communication terminal device 10 and the other communication terminal device are mounted on a mobile body, and a relative distance between the devices may change.

In this case, the "mobile body" is a movable object and the movement speed is arbitrary. In addition, a case where the mobile body is stopped is included. For example, examples of the mobile body include an automobile, a motorcycle, a bicycle, a pedestrian, a train, a ship, a plane, and objects mounted thereon and are not limited thereto.

The term "mounted in a mobile body" includes not only a case where the device is fixed directly to the mobile body but also a case where the device is not fixed to the mobile body but is moved together with the mobile body. For example, the term includes a case where a person getting in or on the mobile body holds the device and a case where the device is mounted in a cargo mounted on the mobile body.

The "fixed object" is an object that does not move, but includes an object that is a rack with a caster to be used in a room, or the like and that can slightly move and can be equated with a fixed object.

The first communication unit 100 "performs communication with another communication terminal device" via a first "communication method".

In this case, the "communication method" is an established communication protocol or an established communication process and may not be a single communication protocol or a single communication process and may be a method in which multiple communication protocols or multiple communication processes coordinate with each other on a communication path. That is, the "communication method" includes a wireless method, a wired method, or a mixed wireless and wired method and may be a method in which a circuit switch, an access point, or a management server relays on the way.

The term "performs communication with another communication terminal device" includes a case where the communication terminal device wirelessly communicates with the other communication terminal device directly, a case where the communication terminal device performs communication via a base station and a phone line or a network, and a case where the communication terminal device performs communication via a server on a network.

A first transceiver 101 transmits and receives data by performing communication via the first communication method.

In addition, before a first connection information processing unit 102 starts data communication via the first communication method, the first connection information processing unit 102 instructs the first transceiver 101 to exchange, with the other communication terminal device, connection information necessary to start to communicate with the other communication terminal device, and the first transceiver 101 exchanges the connection information. Then, the first connection information processing unit 102 performs a connection information process of using the exchanged connection information to prepare to start communication. Specifically, for example, when the first transceiver 101 starts to communicate with the other communication terminal device in the physical layer, the first connection information processing unit 102 performs an authentication process (authentication) after the first transceiver 101 exchanges information of an authentication request and an authentication response, and the first connection information processing unit 102 performs a connection process (association) after the first transceiver 101 exchanges information of a connection request and a connection permission response.

(a) to (c) in FIG. 2 indicate examples in which the vehicle 200 communicates with the vehicle 201 via the first communication method. In FIG. 2, a communication terminal device having the same configuration as that of the communication terminal device 10 is mounted in each of the vehicle 200 and the vehicle 201.

In communication via the first communication method in (a) of FIG. 2, the vehicle 200 and the vehicle 201 wirelessly communicate with each other directly. In the cellular V2X communication technology that uses a cellular communication technique such as LTE to provide connection between a vehicle and another object, the communication corresponds to V2V (between vehicles), V2I (between a vehicle and an infrastructure), or V2P (between a vehicle and a pedestrian).

In the communication via the first communication method, a communication distance within which the communication is possible is longer than that in communication via the second communication method described later. In V2V as an example, a distance at which communication is possible is, for example, in a range from several hundreds of meters to several kilometers, but a bandwidth is narrower than that in the communication via the second communication method and a communication rate is, for example, several Mbps.

In the communication via the first communication method in (b) of FIG. 2, the vehicle 200 communicates with the vehicle 201 via base stations 202 and 203 of a mobile operator and a cellular communication network. In cellular V2X, the communication corresponds to V2N (between a vehicle and a network). In V2N, for example, the vehicle 200 and the vehicle 201 are connected to a phone line or a network from wireless communication conforming to a communication standard such as LTE (Long Term Evolution) via a base station and communicate with each other via the network, and thus there is not a limit on a distance between the vehicle 200 and the vehicle 201. In addition, it is possible to perform communication using a relatively wide band and the communication rate is in a range of several tens of Mbps to several hundreds of Mbps. However, the latter results in relatively high cost because the mobile operator intervenes.

In addition, the communication via the first communication method may be relayed by a communication management server 40 as indicated by (c) in FIG. 2. Radio communication signals of the vehicle 200 and the vehicle 201 pass through the base stations 202 and 203 in the same manner as (b), pass through GWs 204 and 205 that are gateways, enter the Internet, and are transferred to the communication management server 40 connected to the Internet. Then, the communication management server 40 checks communication data transmitted from the vehicle 200 and the vehicle 201 and retransmits the communication data to an appropriate delivery destination.

That is, although information is transmitted and received between the vehicle 200 and the vehicle 201, the communication management server manages destinations of the information and there is an advantage of minimizing leakage of detailed terminal information such as an identifier of a mobile phone, a terminal ID, and the like. Generally, since the vehicle 200 is connected to the communication management server via a base station of the mobile operator and the Internet, there is not a limit on a distance between the vehicle 200 and the vehicle 201, the bandwidth is wide, and the cost is relatively high, like (b) in FIG. 2.

As described above, the communication via the first communication method is performed in various forms, but is long-distance communication in which a distance within which the communication is possible is longer than that in the communication via the second communication method in any case.

The communication via the first communication method is not limited to the aforementioned communication. For example, in (a) of FIG. 2, a wireless device conforming to the 5G standard as cellular V2X may be used. Alternatively, the cellular communication technique may not be used and direct communication based on DSRC (Dedicated Short Range Communication) may be performed between vehicles.

Returning to FIG. 1, the second communication unit 110 "performs communication with the other communication terminal device" via the second "communication method" "different from" the first communication method.

In this case, the term "different" includes a case where the principles of the methods are different and a case where the methods use the same principle and parameters or versions of a communication standard are different. For example, the relationship between IEEE802.11n and IEEE802.11ac for a wireless LAN is exemplified.

Figure 3:
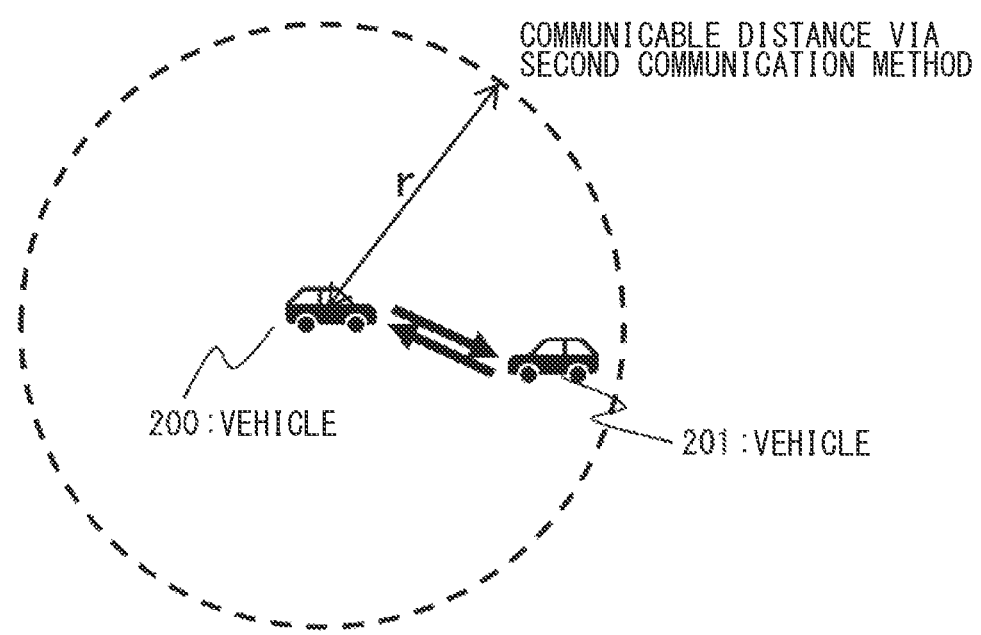
FIG. 3 is an explanatory diagram describing communication via a second communication method by the communication terminal device according to the first embodiment of the present disclosure.

FIG. 3 illustrates an example of the communication via the second communication method.

The communication via the second communication method is near field communication in which a distance (distance r in FIG. 3) within which the communication is possible is shorter than that in the first communication method. The vehicle 200 communicates with the vehicle 201 via the second communication method in a limited distance range in which the communication is possible.

A second transceiver 111 transmits and receives data by performing communication via the second communication method.

Then, before the start of the communication via the second communication method, the second connection information processing unit 112 uses connection information necessary to start to communicate with the other communication terminal device to perform the connection information process of preparing to start the communication. Specifically, for example, for the communication via the second communication method, an authentication process (authentication) is performed using information of an authentication request and an authentication response, a connection process (association) is performed using information of a connection request and a connection permission response, and an IP address acquisition process is performed using information of a request to acquire an IP address and a response. A process sequence at the time of the start of the communication via the second communication method is described later.

In the present embodiment, the second transceiver 111 does not exchange the connection information with the other communication terminal device, and the first transceiver 101 of the first communication unit 100 "exchanges" the "connection information" necessary for the second communication unit 110 to start to communicate with the other communication terminal device before the second communication unit 110 starts data communication. Specifically, instead of the second transceiver 111, the first transceiver 101 exchanges the connection information such as an authentication request and an authentication response relating to the communication via the second communication method, a connection request and a connection permission response, and a request to acquire the IP address and a response. A method for exchanging the connection information is described in detail later with reference to FIGS. 6 and 7.

As examples of the connection information, the authentication request and the authentication response, the connection request and the connection permission response, and the request to acquire the IP address and the response are described. However, the first transceiver 101 does not need to exchange all the connection information and may exchange a part of the connection information.

The "connection information" includes not only data such as a parameter for the connection and a character string but also commands such as a request and a response.

The term "exchanges" includes a case where the information is mutually provided and acquired and a case where the information is provided and acquired substantially in one direction.

The communication via the second communication method is, for example, a wireless LAN method. The wireless LAN is a LAN built on a wireless link and includes a wireless communication method conforming to the communication standard IEEE802.11. The standard IEEE802.11 includes a series of standards that belong to IEEE802.11 and are IEEE802.11n, IEEE802.11ac, and the like.

A distance at which the communication via the second communication method is possible largely varies depending on the wireless communication standard, a frequency, transmission output, whether a building is present, a rainfall situation, and the like, and is, for example, in a range of several meters to several tens of meters although it is not necessarily in the range. Meanwhile, the communication via the second communication method can be performed with a lower delay and a wider bandwidth than those of the communication via the first communication method. For example, the communication can be performed at a communication rate of several Gbps. In addition, since the communication terminal devices 10 wirelessly communicate with each other directly, the communication can be performed with low cost.

The communication via the second communication method is not limited to the wireless LAN method and may be a UWB (ultra wide band system) that is a communication method shared with an in-vehicle radar, for example.

The position detection unit 120 includes a GPS receiver and detects an absolute position based on a geodetic system such as WGS 84. For the positioning of the absolute position, a GPS satellite or another positioning satellite such as GLONASS, Galileo, or Michibiki may be used. In addition, when not only the position at reception time is calculated but also the current position may be corrected and estimated using a velocity detected by the GPS receiver when the communication terminal device 10 is mounted on a mobile body. When the mobile body is a vehicle, the current position may be corrected and interpolated using a vehicle pulse or information of a gyroscope sensor, or road data of a car navigation system may be used to detect a driving road. In addition, not only the position at GPS reception time and the position at the current time but also information such as an average movement speed, map data of the car navigation system, the road data, and route guidance data may be used to estimate the position that can be taken in the future.

In the present embodiment, the position detection unit 120 is included in the communication terminal device 10, the position detection unit 120 may be provided outside the communication terminal device 10, and the communication terminal device 10 may receive and acquire position information from the position detection unit 120.

The storage unit 130 stores acquired contents. The contents are various types of information such as the map data, firmware of the car navigation system or the like, road traffic information, natural disaster information, information of nearby tourist destinations and shops, various images, video data, and product information.

Not only the contents acquired in advance but also contents acquired from other vehicles, communication terminals, a content server on the Internet, and the like via communication of the second communication unit 110 as described later are stored. In addition, when the contents are stored, a time and date when the contents are acquired or a time and date when the contents are updated, a location at which the contents are acquired, a source from which the contents are acquired, a method for acquiring the contents, and the like may be stored.

The storage unit 130 stores, for example, various data that is a wireless type, the ID of the other communication terminal device, the IP address, an encryption key, and the like and is necessary for communication of the first communication unit 100 and the second communication unit 110, and data that is acquired by the first communication unit 100 and the second communication unit 110 and is content information indicating a holding status of contents of the other communication terminal device, and position information indicating the position of the other communication terminal device.

In addition, the storage unit 130 may store position information and content information of the communication terminal device 10.

The control unit 140 includes a first communication controller 141 that controls the first communication unit 100, and a second communication controller 142 that controls the second communication unit 110. The control unit 140 includes a processor such as a CPU or a DSP. A part or all of processes of the first communication controller 141 and the second communication controller 142 may be implemented by software executed by the processor.

The control unit 140 controls the first communication unit 100 and the second communication unit 110 to communicate with the other communication terminal device and exchange various types of information. To acquire or provide contents as the various types of information, the control unit 140 extracts content data from the storage unit 130 and performs control to store the content data.

Next, before detailed description of the exchange of the connection information according to the present embodiment, a communication sequence that is a process performed until the vehicle 200 and the vehicle 201 perform data communication via the second communication method according to a conventional method is described with reference to FIG. 4.

Figure 4:
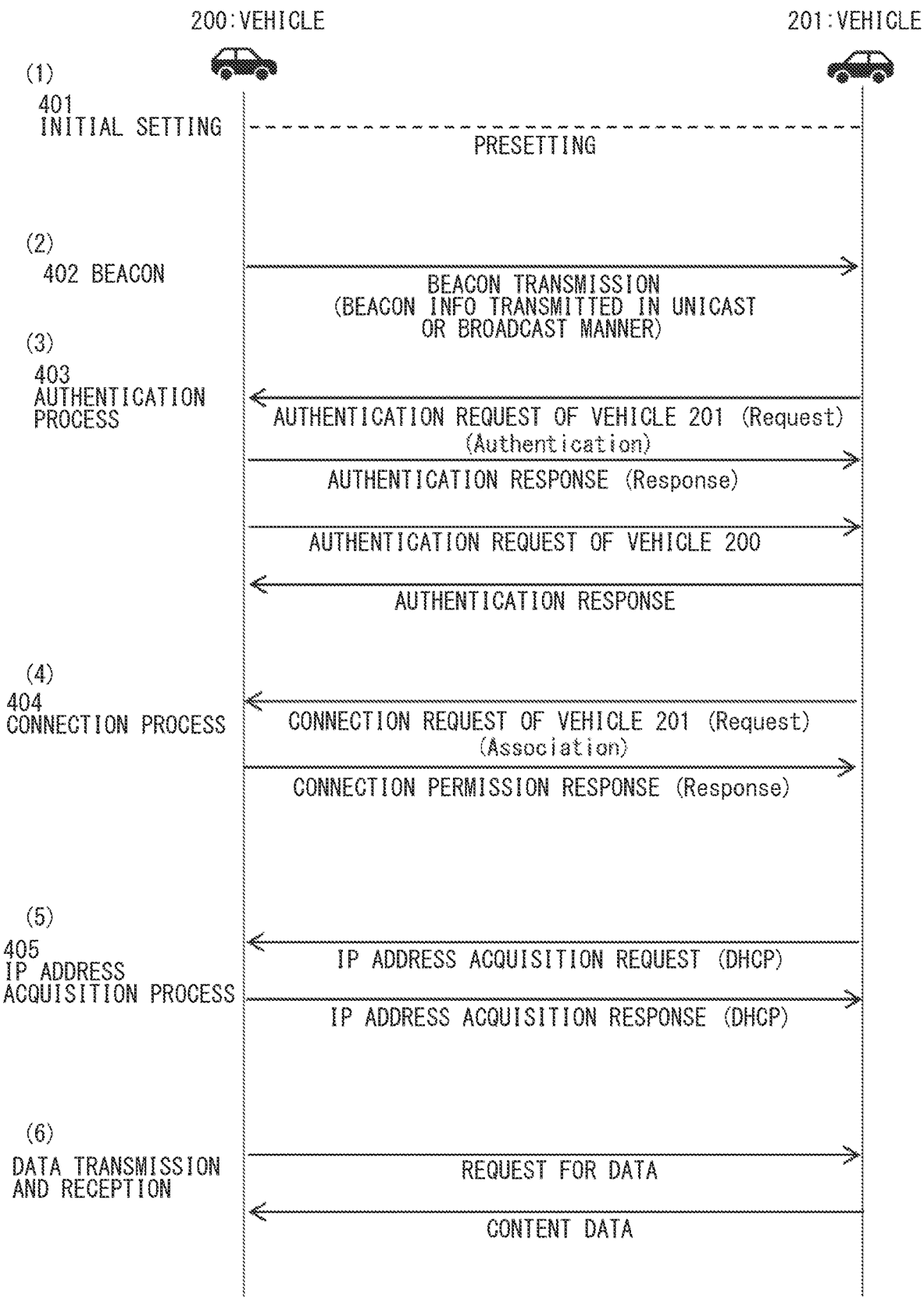
FIG. 4 is a comparative example showing a diagram illustrating a communication sequence that continues until communication is started via the second communication method.

In FIG. 4, an initial setting 401 is performed before communication such as actual transmission and reception of a radio wave in the physical layer is started. For example, GON (group owner negotiation) is performed to determine whether the vehicle 200 or the vehicle 201 will be a group owner. In the example of FIG. 4, it is assumed that the vehicle 200 is the group owner. It suffices for the group owner to execute all or a part of functions of an access point.

In the present specification, the communication terminal device that is the group owner is referred to as a master device as appropriate and a communication terminal device other than the group owner is referred to as a slave device.

The group owner transmits a beacon for starting communication in the communication via the second communication method. However, to perform unicast transmission on the beacon, information that specifies a communication target and is a communication ID of a destination or the like is acquired in advance.

When the group owner is not set in advance and a dynamic scanning method is performed as described later, the group owner is determined after the establishment of the communication via the second communication method and thus the initial setting 401 may not be performed.

First, the vehicle 200 that has become the group owner transmits a beacon 402 and an SSID (service set identifier) thereof and information of a beacon transmission interval, frequency information, a transfer rate, and the like. When a specific single communication target is already determined, unicast communication in which a single destination is specified may be performed. When communication is performed with any of multiple communication targets, broadcast communication may be performed.

As described above, in addition to a static scanning method for transmitting a beacon from the group owner, although not illustrated in the drawings, when the group owner is not determined in advance, a dynamic scanning method for transmitting a probe request inquiring about the group owner from the vehicle 201 to the vehicle 200 and for returning a probe response to the request from the vehicle 200 may be performed, like an access point determination phase of Wi-Fi Direct (registered trademark), for example.

In any case, the communication is started by the beacon or the probe request and the probe response in the physical layer, and the following processes 403 to 405 are subsequently performed.

In the authentication process 403, the authentication process (authentication) is performed. For example, the vehicles exchange an authentication request and an authentication response including the acceptance/rejection of the authentication with each other. Authentication may be performed based on a MAC (media access control) address or may be performed by transmitting and receiving a passphrase using a shared key or public key prepared in advance for each vehicle. Alternatively, open authentication may be performed. In the open authentication, when an authentication request including information such as the SSID of the vehicle 200 is provided from the vehicle 201 side that is a client, the vehicle 200 necessarily returns a response indicating that the authentication is successful.

In the connection process 404, the connection process (association) is performed. For example, when the vehicle 201 transmits a connection request and the vehicle 200 returns a connection permission response, each of the vehicle 200 and the vehicle 200 performs a process of registering the other as a communication target.

In the IP address acquisition process 405, the IP address acquisition process is performed. For example, assignment information of IP addresses necessary for network connection for communication according to the IP (Internet Protocol) is exchanged according to the DHCP (Dynamic Host Configuration Protocol).

The DHCP is an application layer protocol to be used to dynamically assign, to the client-side communication terminal device from the master-side communication terminal device, information necessary for connection to a network via the IP and the start of communication. The aforementioned IP addresses and node information such as a subnet mask and a default gateway are transmitted as the connection information.

In the IP address acquisition process 405, the vehicle 200 transmits information of the IP address assigned and the like using an IP address acquisition response to a request to acquire the IP address from the vehicle 201.

Specific information used in the IP address acquisition process 405 and command exchange are not limited to the above description and are arbitrary. For example, connection information is exchanged in such a manner that the slave device broadcasts a command to search for a DHCP server (discover), the master device proposes provision of an IP address according to the DHCP (offer), and when the slave device accepts the proposal and transmits a request to provide the address (request), and the master device returns a response to permit the delivery of the IP address.

When the IP addresses of the devices are determined in the communication via the second communication method, communication can be performed according to the IP protocol in the network layer or the Internet layer. That is, data communication can be performed by a user or a high-level application.

As described above, to actually perform the data communication via the second communication method, it is necessary to perform the connection information process such as a process such as the GON before the establishment of the communication, the authentication process 403, the connection process 404, and the IP address acquisition process 405, in addition to the establishment of physical communication from beacon transmission to the connection of the physical layer via the transmission and reception of a radio wave signal, or the like. As a premise thereof, it is necessary to exchange and acquire the connection information that is information necessary for these processes.

It becomes possible to transmit and receive data only after performing the connection information process. For example, when a request for specific content data is provided from the vehicle 200, the content data is transmitted from the vehicle 201.

However, in the process sequence, it takes a lot of time to exchange the connection information such as the authentication request and the authentication response, the connection request and the connection permission response, and the IP address acquisition request and the IP address acquisition response, and it also takes time for the connection information process itself such as the authentication process, the connection process, and the IP address acquisition.

As illustrated in FIG. 3, an area where the second communication unit 110 can perform communication is limited. In addition, when objects travel in opposite directions, like the vehicle 200 and the vehicle 201 illustrated in FIG. 3, a period of time when communication is possible is even more limited. When it is necessary to exchange data as much as possible without interrupting the exchange of desired content information, it is preferable to minimize overhead caused until the start of data communication such as the exchange of connection information and the connection information process.

Therefore, in the present embodiment, before the second communication unit 110 starts communication, the first communication unit 100 exchanges the connection information necessary for the second communication unit 110 to start to communicate with the other communication terminal device.

Therefore, it is possible to complete a part or all of the connection information process that needs to be performed at the beginning of the communication of the second communication 110 in advance. As the connection information process to be performed in advance, for example, the GON, the authentication process, the connection process, and the IP address connection process are performed.

Of course, it is not necessary to perform all the GON, the authentication process, the connection process, and the IP address connection process and it suffices to perform one or two or more of the GON, the authentication process, the connection process, and the IP address connection process.

Figure 5:
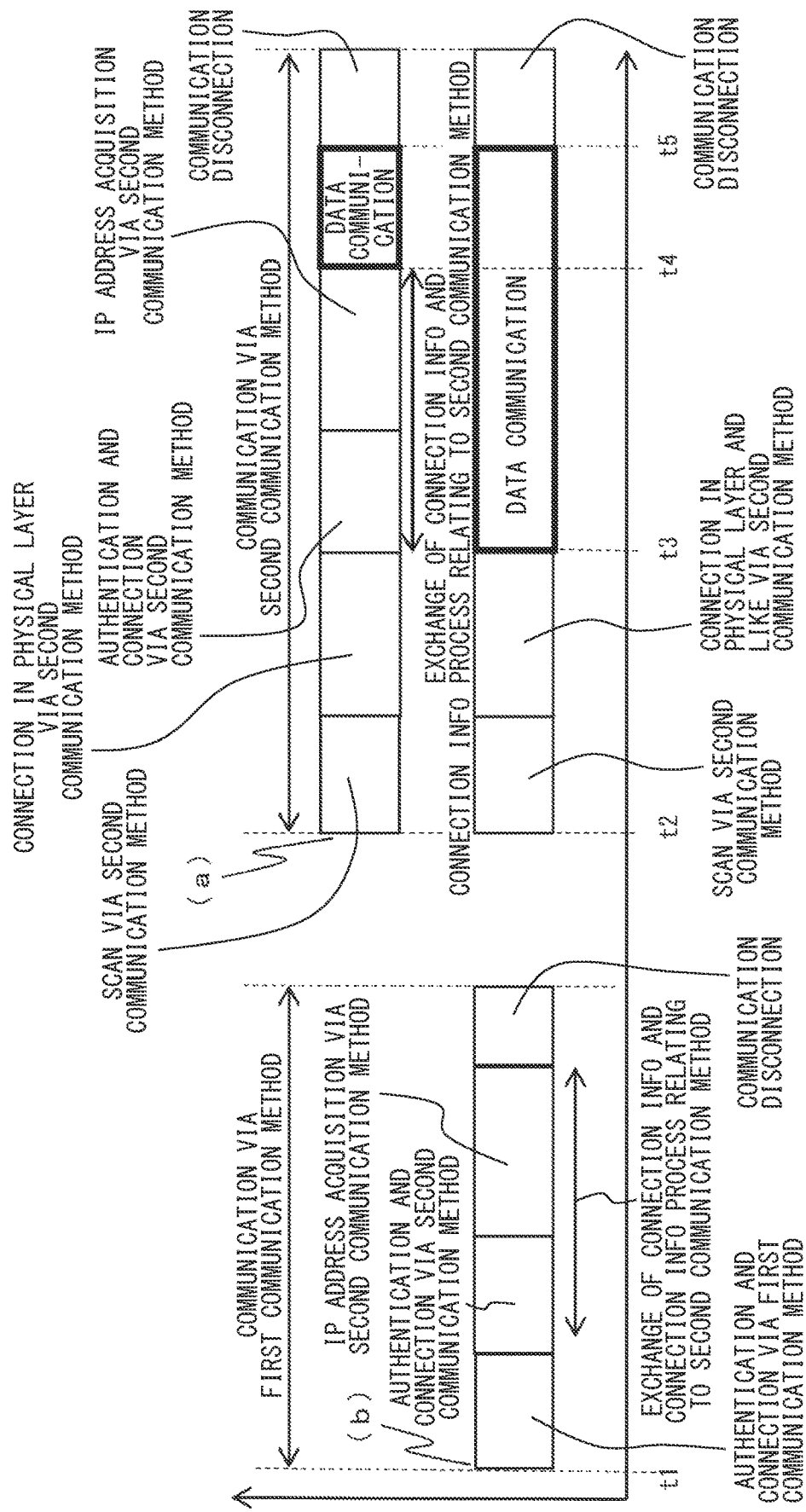
FIG. 5 is an explanatory diagram describing a communication sequence on a time axis that continues until communication is started via the second communication method by the communication terminal device according to the first embodiment of the present disclosure.

FIG. 5 is an explanatory diagram describing a communication sequence on a time axis that continues until the communication terminal device 10 according to the first embodiment starts data communication. An upper part (a) of FIG. 5 indicates a communication sequence for communication via the conventional second communication method, while a lower part (b) of FIG. 5 indicates a communication sequence in which communication via the first communication method relating to the communication terminal device 10 according to the first embodiment and communication via the second communication method are used.

As indicated by (a) in FIG. 5, in the communication via the conventional second communication method, since the exchange of the connection information and the connection information process are performed, the time to be spent on net data communication is shortened.

On the other hand, as indicated by (b) in FIG. 5, by having performed the communication via the first communication method to exchange the connection information necessary for communication via the second communication method in advance and performed the connection information process, overhead processing performed at the beginning of the communication via the second communication method is reduced. In the example illustrated in FIG. 5, the time during which data communication can be performed increases by a time of t4–t3 in (b) of FIG. 5 as compared with (a) of FIG. 5.

A specific method for exchanging the connection information that is performed before communication by the second communication unit 110 is described with reference to FIGS. 6 and 7. As the exchange of the connection information and the connection information process, two examples illustrated in FIGS. 6 and 7 are provided. 601 to 605 indicate the flow of data such as main control data and the connection information.

Figure 6:
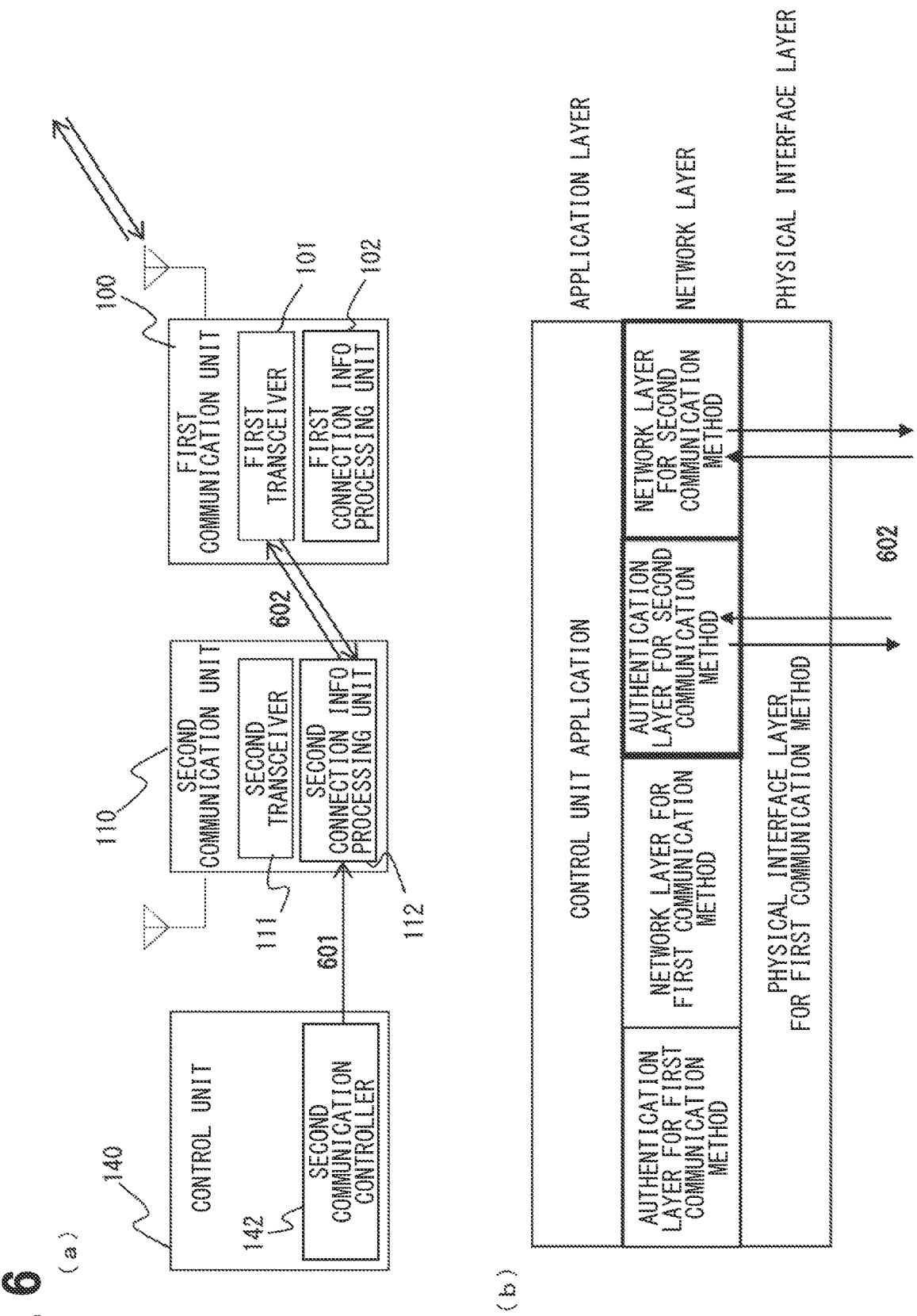
FIG. 6 is an explanatory diagram describing a method for exchanging connection information by the communication terminal device according to the first embodiment of the present disclosure.
Figure 7:
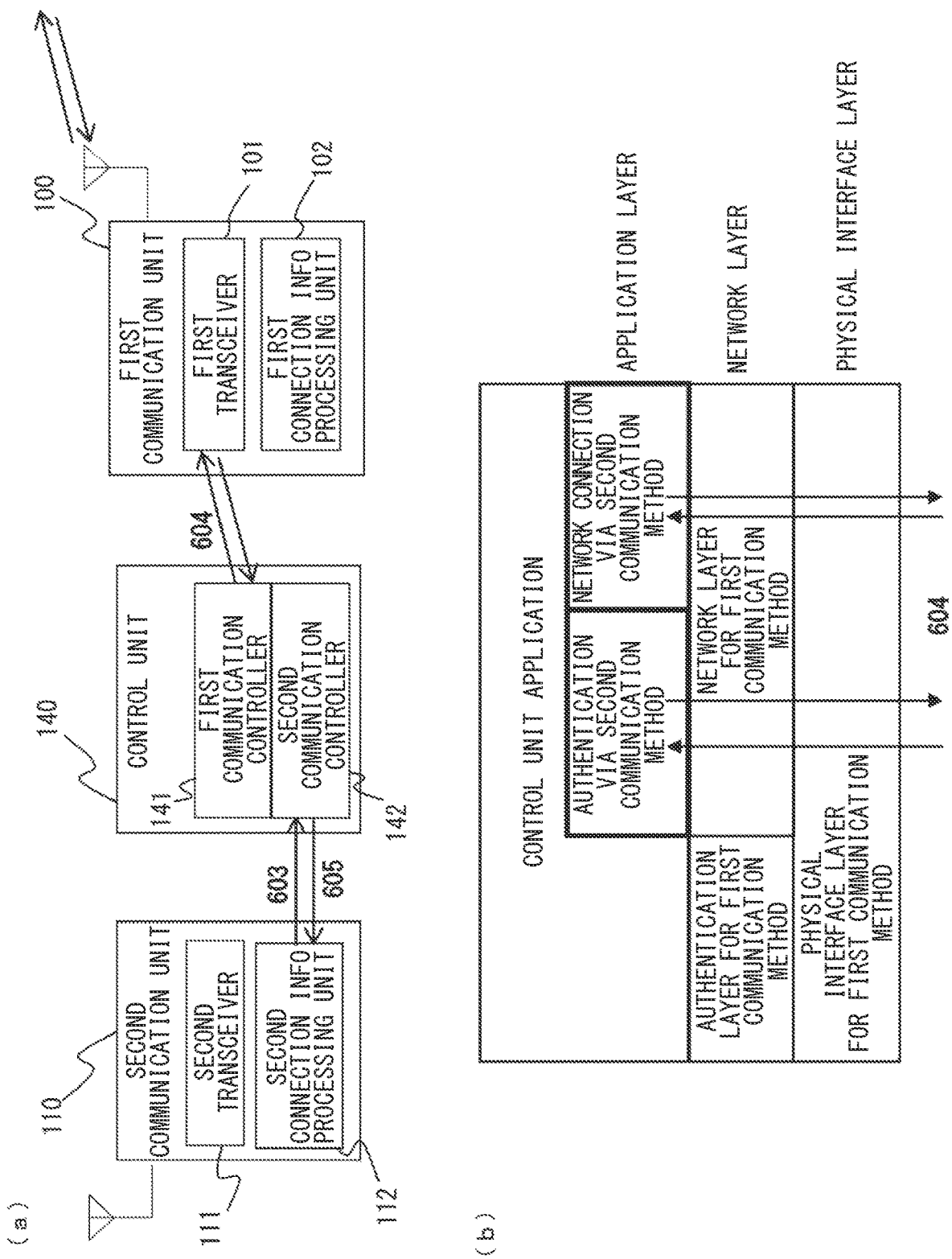
FIG. 7 is an explanatory diagram describing the method for exchanging the connection information by the communication terminal device according to the first embodiment of the present disclosure.

In a first example of the method for exchanging the connection information in FIG. 6, as indicated by (a) in FIG. 6, the second communication controller 142 of the control unit 140 instructs the second connection information processing unit 112 to exchange the connection information via the first transceiver 101, and thus the first transceiver 101 exchanges the connection information.

Specifically, as the instruction, the second communication controller 142 instructs the second connection information processing unit 112 to change a MAC address set by the second connection information processing unit 112 to transmit and receive the connection information from the MAC address of the second transceiver 111 to the MAC address of the first transceiver 101, and performs control to change a communication path (601).

Therefore, the connection information is exchanged using the first transceiver 101 instead of the second transceiver 111 (602).

For example, when the second connection information processing unit 112 performs authentication on the communication via the second communication method, the first transceiver 101 exchanges authentication information as if the second transceiver 111 exchanges the authentication information. It is possible to progress the authentication without a problem since the MAC address of a source of a data packet to be transmitted to the other communication terminal device and a MAC address to be transmitted and received using authentication information in the same manner as MAC authentication are changed to the MAC address of the first transceiver 101.

After the connection information process by the second connection information processing unit 112 is ended, the second communication controller 142 instructs the second connection information processing unit 112 to sets the MAC address to the original setting.

(b) of FIG. 6 indicates a diagram illustrating communication in a first connection information exchange method using a hierarchical structure.

Originally, connection information to be transmitted and received via the physical interface layer for the second communication method is transmitted and received via the physical interface layer for the first communication method. That is, the authentication layer for performing authentication on the communication via the second communication method, and the network layer for performing Internet communication in the communication via the second communication method using protocols such as the IP, the TCP, the UDP, and the DHCP for setting IP addresses have a structure on the physical interface layer for the first communication method.

Of course, the above-described hierarchical structure is an example and is not limited to this hierarchical structure. The same applies to (b) of FIG. 7 described later.

In a second example of the method for exchanging the connection information in FIG. 7, as indicated by (a) in FIG. 7, the control unit 140 controls the first transceiver 101 instead of the second connection information processing unit 112, and the first transceiver 101 exchanges the connection information.

Specifically, the second communication controller 142 acquires, from the second connection information processing unit 112, information necessary for the communication via the second communication method, for example, information of the SSID and the MAC address and data for performing authentication, and starts alternative processing control (603).

The first communication controller 141 controls the first transceiver 101 instead of the second connection information processing unit 112 based on the information acquired from the second connection information processing unit 112, thereby transmitting and receiving the connection information necessary to start the communication via the second communication method (604).

Then, the control unit 140 performs, based on the connection information, the connection information process such as the authentication in the communication via the second communication method instead of the second connection information processing unit 112.

When the connection information process is ended, the second communication controller 142 transmits results of the connection information process to the second connection information processing unit 112 and ends the alternative processing control (605).

(b) of FIG. 7 indicates a diagram illustrating communication in a second connection information exchange method using a hierarchical structure.

Originally, the connection information to be transmitted and received via the physical interface layer for the second communication method is transmitted and received via the physical interface layer for the first communication method, and this feature is the same as the example indicated by (b) in FIG. 6.

In the method indicated by (b) in FIG. 7, controller software exchanges the connection information and performs the connection information process using the network layer for the communication via the second communication method. The controller software is a higher-level application than the network layer.

For example, a part of the controller software is implemented in the first communication controller 141, exchanges the connection information in the communication via the second communication method using a UDP/IP packet in the communication via the first communication method, and performs the connection information process.

The method illustrated in FIG. 6 or 7 makes it possible to exchange the connection information necessary for the communication via the second communication method by performing the communication via the first communication method.

In the above-described example, the control unit 140 provides the instruction as illustrated in FIG. 6 or performs the control as illustrated in FIG. 7 to exchange the connection information necessary for the communication via the second communication method in the communication via the first communication method in advance. However, as another method, the second communication unit 110 may autonomously perform the exchange or the second communication unit 110 may coordinate with the first communication unit 110 to perform the exchange, and it does not matter how it is implemented.

In addition, a process including the process of the second connection information processing unit 112 and the processes of the first communication controller 141 and the second communication controller 142 are implemented by the software as described above to flexibly handle the authentication and a change of the connection, but may be implemented by hardware such as an LSI.

With the configuration of the first embodiment described above, it is possible to perform the processes, which are the authentication process, the connection process, the IP address acquisition process, and the like and are the overhead of communication, in the communication via the first communication method in advance before the communication via the second communication method is performed. As a result, it is possible to take a lot of time for net data communication and provide and acquire a large amount of content information. This becomes even more noticeable when a period of time when communication is possible is short. For example, when vehicle-to-vehicle communication between a subject vehicle and another vehicle traveling in an oncoming lane is assumed, a period of time when communication is possible is a short period of time when the two vehicles pass each other, but it is possible to effectively use the short period of time.

In addition, compared with a case where a large amount of content information is acquired only in the communication via the first communication method, the information is acquired via near field and direct communication and thus the communication cost is low.

Furthermore, since the exchange of the connection information and the connection information process can be completed before the connection for the communication via the second communication method, it is possible to reliably perform the communication via the second communication method.

(2) Operation of Communication Terminal Device

An operation of the communication terminal device 10 is described with reference to a flowchart of FIG. 8.

The following operation indicates not only the communication method of the communication terminal device 10 but also a process procedure of a communication program executed by the communication terminal device 10. Hereinafter, the same applies to flowcharts of each embodiment.

In step 101, the communication via the first communication method is started between the communication terminal device 10 and the other communication terminal device. First, when the communication via the first communication method is started, the authentication process and the connection process are performed for the communication via the first communication method, and after that, data communication is started by the communication via the first communication method.

In step 102, the exchange of the connection information relating to the communication via the second communication method and the connection information process are performed in the communication via the first communication method. More specifically, as indicated by (b) in FIG. 5, the connection information necessary to start the communication via the second communication method is exchanged using the communication via the first communication method, and the connection information process such as the authentication process, the connection process, and the IP address acquisition process is performed based on the connection information. Although not illustrated in FIG. 5, information regarding the GON is exchanged and negotiation and determination are performed based on the information in order to determine which communication terminal device becomes the master device that is the group owner.

After the connection information process, data transmitted and received in the communication via the second communication method, for example, device control data and content data other than the connection information may be processed or the like.

In step 103, the master device that is the group owner starts to periodically transmit a beacon in the communication via the second communication method.

In step 104, when the slave device receives the beacon or a transmission signal from the master device, the authentication and connection processes relating to the communication via the second communication method are already performed and thus the data communication via the second communication method is performed in step 105.

The communication via the second communication method is continued until the distance between the communication terminal devices becomes equal to or longer than a certain distance in step 106 and during the time when the slave device can receive the transmission signal of the master device in step 104.

The determination of the distance in step 106 can be implemented by periodically acquiring the position of the other communication terminal device that is a communication target by, for example, the communication via the second communication method and calculating the distance between the communication terminal devices based on a difference from the position of the communication terminal device 10 that has been acquired from the position detection unit 120. The distance between the communication terminal devices may be estimated using the reception strength of a beacon or packet of the other communication terminal device.

In step 107, when the slave device becomes unable to receive the transmission signal of the master device in step 104 and/or it is determined that the distance between the communication terminal devices is equal to or longer than the certain distance in step 106, the communication via the second communication method is disconnected and the connection information for the second communication method that has been set in the control unit 140 of the communication terminal device 10 and the second communication unit 110 is deleted.

By performing the above-described operation and using the communication via the first communication, it is possible to promptly start the communication via the second communication method and smoothly and efficiently perform the communication.

2. Second Embodiment

In the first embodiment, attention is paid to the feature in which the connection information necessary for the second communication unit 110 to start to communicate with the other communication terminal device is exchanged in advance. In the first embodiment, how the other communication terminal device that is a communication target of the second communication unit 110 is identified is not described.

Therefore, in the present embodiment, attention is paid to how the above-described communication target is identified.

Since three variations relating to the communication via the first communication method are considered, the second embodiment describes the three variations with reference to FIG. 9.

In FIG. 9, constituent elements surrounded by thick lines are elements as main parts for identifying a communication target.

In addition, the other communication terminal device is represented by a single rectangular element. However, there is not only a case where the other communication terminal device is represented by a single element but also a case where other communication terminal devices are represented by two or more elements as described later.

As indicated by (A) in FIG. 9, the communication terminal device 30 directly communicates with the other communication terminal device via the first communication method, acquires the position information and content information of the other communication terminal device, and uses the information to identify the other communication terminal device that is a communication target.

As indicated by (B) in FIG. 9, the communication terminal device 30 communicates with the communication management server 40 via the first communication method, acquires the position information and content information of the other communication terminal device via the communication management server 40, and uses the information to identify the other communication terminal device that is a communication target.

As indicated by (C) in FIG. 9, a communication management server 50 relays communication like (B) in FIG. 9, but the communication management server 50 acquires the position information and content information of the communication terminal device 10 and the position information and content information of the other communication terminal device and uses the information to identify the other communication terminal device that is a communication target of the communication terminal device 30.

The variations of the second embodiment correspond to the above-described (A) to (C) of FIG. 9 and represented by "2A embodiment" to "2C embodiment" with branch numbers and described in order.

(1) 2A Embodiment

Regarding the 2A embodiment, communication between vehicles is described as an example.

Figure 10:
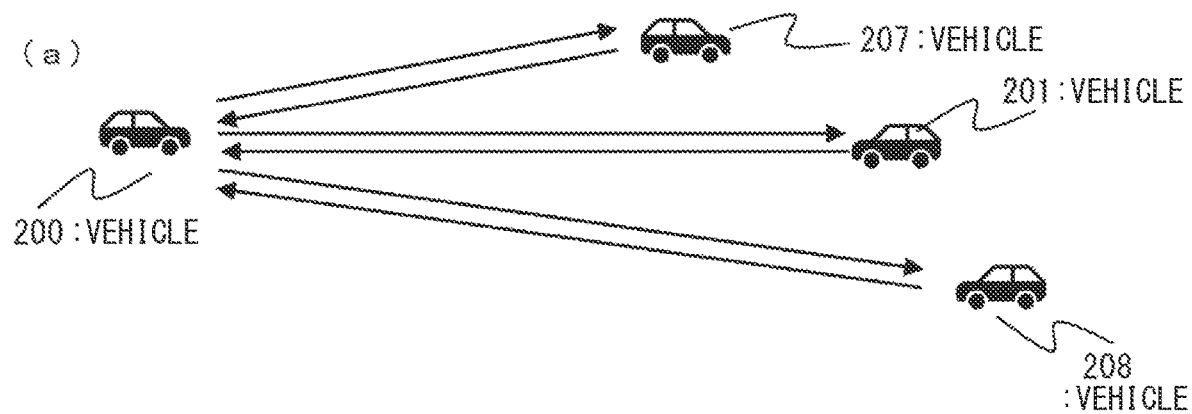
FIG. 10 is an explanatory diagram describing communication via the first communication method by a communication terminal device according to a 2A embodiment of the present disclosure.

As illustrated in FIG. 10, the communication terminal device 30 is mounted on the vehicle 200, other communication terminal devices are mounted on the vehicle 201, a vehicle 207, and a vehicle 208, and the vehicle 200 and each of the vehicle 201, the vehicle 207, and the vehicle 208 communicate with each other via the first communication method.

As described with reference to (A) of FIG. 9, the vehicle 200 acquires position information and content information of the vehicle 201, the vehicle 207, and the vehicle 208 by performing the communication via the first communication method and uses the information to identify the other communication terminal devices that are communication targets.

Therefore, the communication terminal device 30 mounted on the vehicle 200 has a configuration described below.

Figure 11:
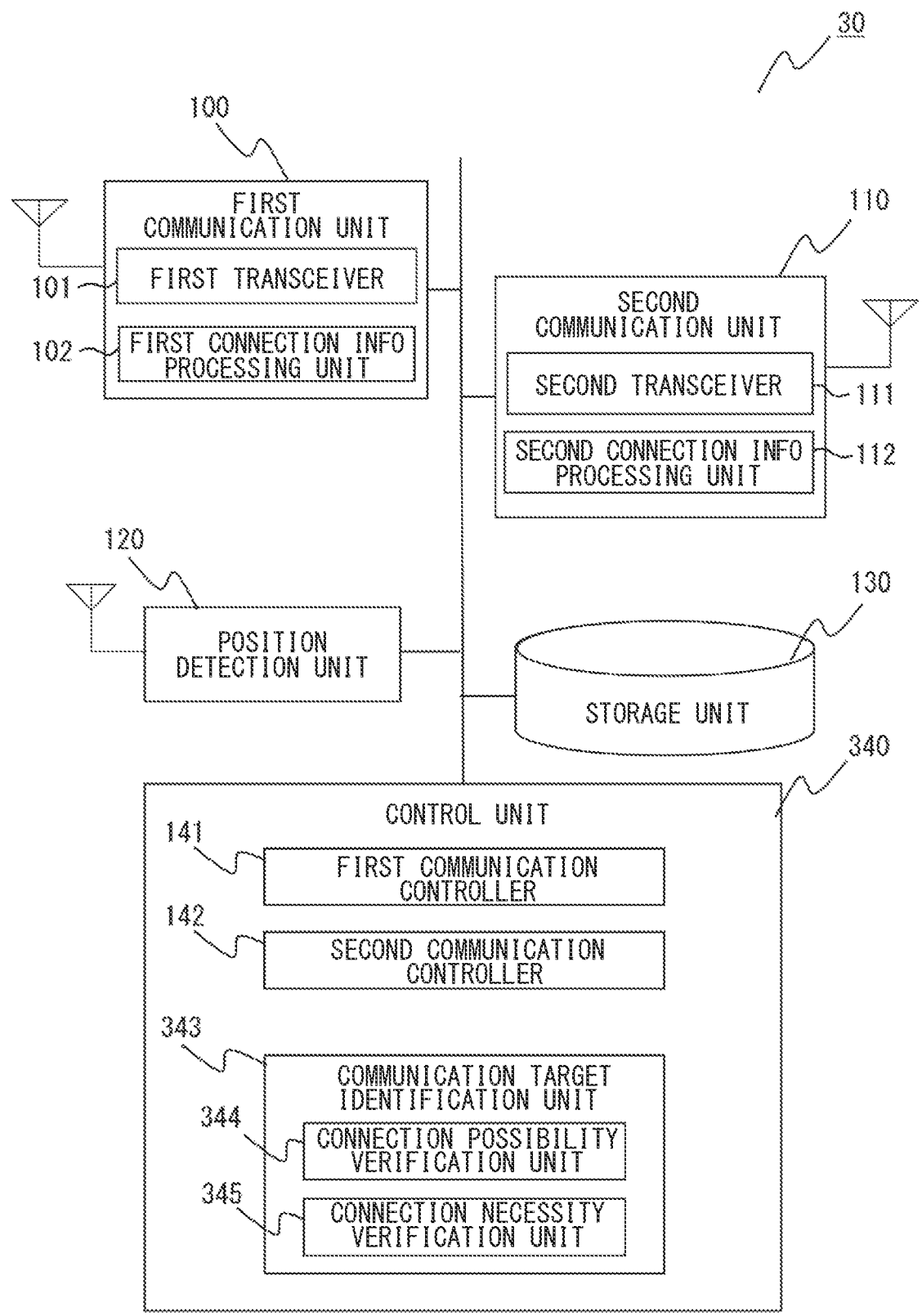
FIG. 11 is a block diagram illustrating a configuration example of the communication terminal device according to the 2A embodiment of the present disclosure.

(a) Configuration of Communication Terminal Device 30 According to 2A Embodiment FIG. 11 illustrates the configuration of a communication terminal device 30 according to the 2A embodiment.

Parts that are the same as the parts described in the first embodiment are denoted by the same reference signs as those described in the first embodiment, the descriptions of the first embodiment are quoted, and descriptions of the parts are omitted in the following description. Parts different from the first embodiment will be mainly described.

The first communication unit 100 receives "position information" indicating the positions of the other communication terminal devices and "content information" indicating holding statuses of contents of the other communication terminal devices.

Explaining with reference to the example of FIG. 10, the vehicle 200 sequentially attempts to communicate with the vehicle 201, the vehicle 207, and the vehicle 208 via the first communication method. When the vehicle 200 becomes able to perform data communication with each of the vehicles, the vehicle 200 acquires the position information of each of the vehicles and the content information held in each of the vehicles.

In this case, it suffices for the "position information" to be information on the positions. The positions may be absolute positions relative to the world coordinates or relative positions to a predetermined position as a reference. In addition, the position information may include not only information of the current positions but also information for estimating future positions. For example, the position information may include time when the positions have been acquired, velocities, acceleration, orientation, angles of slopes, and road information. In addition, the position information may be information from which the positions can be indirectly estimated. The position information also includes the reception strength of a beacon and a packet, for example.

The "content information" includes not only the information indicating the contents held but also information indicating contents not held and information for requesting contents necessary on the premise of the contents not held.

The above-described acquired position information and the above-described acquired content information are stored in the storage unit 130. FIG. 12 illustrates an example of the information stored in the storage unit 130.

As the position information, the absolute positions, velocity vector values, information of a road on which the vehicles travel, and information of time when the information has been measured are stored. In addition, a traveling plan and information of a target destination may be acquired.

As the content information, details of contents acquired by the vehicles, data sizes of the contents, information of a preliminary update time and date are stored.

In addition, the storage unit 130 may store the position information and content information of the vehicle 200 that is an own vehicle. The type of the information stored in the vehicle 200 may be different from that of information stored in the other vehicles.

A control unit 340 includes a communication target identification unit 343 that identifies the other communication terminal devices that perform communication via the second communication method.

The communication target identification unit 343 includes a connection possibility verification unit 344 that verifies, based on the position information, whether connection to the other communication terminal devices via the second communication method is possible, and a connection necessity verification unit 345 that verifies, based on the content information, whether the connection to the other communication terminal devices is necessary.

From the verification results of the connection possibility verification unit 344 and the connection necessity verification unit 345, the communication target identification unit 343 identifies the other communication terminal devices that are communication targets in the following manner. In the following description, identifying the other communication terminal devices that are the communication targets is simply referred to as identifying the communication targets.

In the example of FIG. 10, the connection possibility verification unit 344 acquires, from the position detection unit 120 or the storage unit 130, the current position, a velocity, and measurement time of the vehicle 200 and information of a driving road on which the vehicle 200 travels, and estimates a position at which the vehicle 200 arrives after the elapse of a predetermined period of time and a driving road on which the vehicle 200 travels after the elapse of the predetermined period of time. For example, since the current position, the velocity, and the measurement time are known, if the vehicle 200 will travel at a fixed speed in the future, it is possible to estimate the position and the velocity after the elapse of the predetermined period of time. In addition, the estimation may be performed using information of a traveling plan and a target destination.

Meanwhile, by calculating the positions and velocities of the other vehicles 201, 207, and 208 after the elapse of the predetermined period of time in the same manner, relative distances and relative velocities between the vehicle 200 and the other vehicles are calculated. Therefore, the connection possibility verification unit 344 verifies whether communication using the second communication unit 110 can be performed between the vehicle 200 and the other vehicles. In addition, when the communication using the second communication unit 110 can be performed, a point of time when the communication becomes possible and a period of time when the communication is possible are calculated.

Instead of estimating the position of the communication terminal device 30 and the positions of the communication terminal devices, the connection possibility verification unit 344 can use a signal level received by the communication terminal device 30 via the first communication method for the verification of the possibility of the connection, for example. For example, when the signal level increases over time, it may be determined that the communication terminal device 30 approaches and passes the other communication terminal devices and that the connection may be possible. Alternatively, when the communication terminal device 30 can simply communicate with the other communication terminal devices via the first communication method, it may be estimated that the other communication terminal devices are present near the communication terminal device 30 and it may be determined that the connection may be possible.

The connection necessity verification unit 345 first extracts the content information of the vehicle 200 from the storage unit 130. The content information indicates the contents held in the vehicle 200. Alternatively, contents not held in the vehicle 200 may be identified in advance based on the contents held in the vehicle 200, and the content information may be described as information requesting the contents not held in the vehicle 200. Alternatively, the content information may be described as information requesting the contents not held in the vehicle 200 on the implicit premise that the contents are not held in the vehicle 200. For example, the content information is a request from another system in the vehicle, such as a car navigation system, as an example, a request to acquire congestion information, road information of a destination, or updated map information, and a request to acquire contents of restaurants and shops input via a man-machine interface from a driver.

The connection necessity verification unit 345 compares the content information of the vehicle 200 with the content information acquired by the other vehicles 201, 207, and 208 illustrated in FIG. 12 to identify a vehicle holding contents required by the vehicle 200. That is, whether it is necessary to connect to each of the vehicles for communication via the second communication method, that is, the need for the connection is verified.

The content information may include not only details of the content data but also a data size, an update time and date, and the like. The information may be considered for the verification of the need for the connection. For example, information acquired when the time required for downloading exceeds a period of time when communication is possible, and information acquired before a specified time and date may be excluded.

An example of the determination by the communication target identification unit 343 in the examples illustrated in FIGS. 10 and 12 is described.

In the case illustrated in FIGS. 10 and 12, when the connection possibility verification unit 344 estimates the positions after the elapse of a predetermined time from the position information of the vehicle 200 and the position information of each of the vehicles, it is found that the vehicle 201 and the vehicle 208 enter a distance range in which communication is possible, but the vehicle 207 goes away from the vehicle 201 and does not enter the distance range in which communication is possible. Therefore, the connection possibility verification unit 344 determines that it is possible to connect the two vehicles 201 and 208 to each other.

In the example illustrated in FIG. 12, when the contents required by the vehicle 200 are local map information, it is found that vehicles that have acquired the information are the vehicle 201 and the vehicle 207, and thus the connection necessity verification unit 345 determines that either the vehicle 201 or the vehicle 207 needs to be connected.

The communication target identification unit 343 selects, based on the verification results of the connection possibility verification unit 344 and the connection necessity verification unit 345, the vehicle 201 as a communication target with which communication via the second communication method is to be performed.

The position information and the content information are not limited to the formats and contents illustrated in FIG. 12.

As the position information, relative velocity information such as acceleration and a vehicle velocity pulse, guide information of a car navigation, and the like can be used.

Although one item is displayed as the content information in each of the vehicles for convenience, the content information is not limited to the one item and may be a plurality of content information items. In addition, a period of time elapsed from an update may be used instead of an update time and date.

As described above, the communication terminal device 30 causes the communication target identification unit 343 to verify the possibility of the connection and the need for the connection for the communication with each of the vehicles via the second communication method, thereby being able to identify, from the other communication terminal devices, an optimal communication target with which communication via the second communication method is to be performed.

In addition, since a communication target device is selected via the verification of the possibility of the connection and the verification of the need for the connection, the number of events that cause the communication to fail or be stopped after the attempt of the communication via the second communication method is reduced, and the number of retries for the communication is reduced, the communication via the second communication method is substantially efficiently performed.

(b) Operation of Communication Terminal Device According to 2A Embodiment

Figure 13:
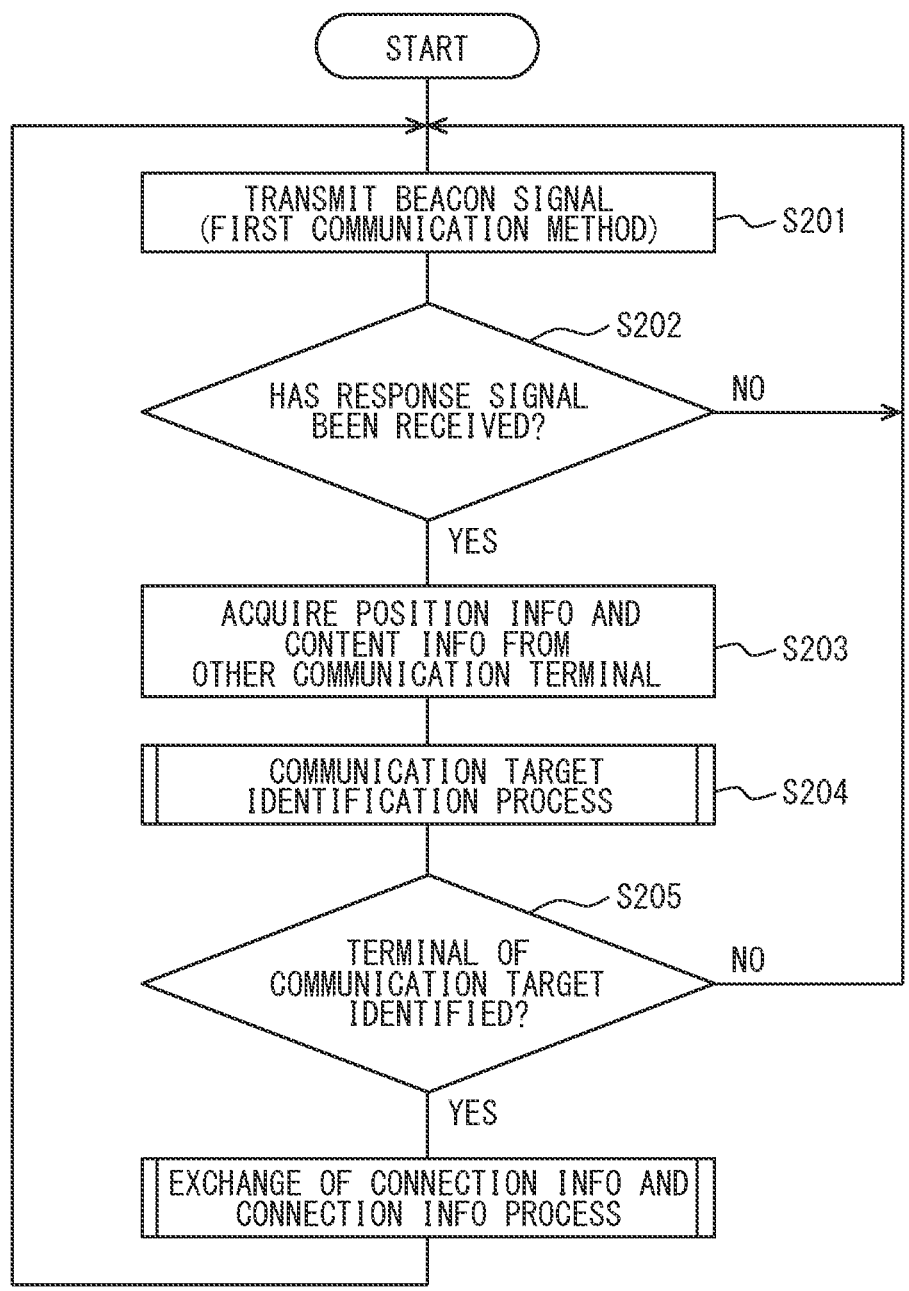
FIG. 13 is a flow diagram illustrating an operation of the communication terminal device according to the 2A embodiment of the present disclosure.

An operation of the communication terminal device 30 is described with reference to a flowchart of FIG. 13.

The same steps as those described in the first embodiment are denoted by the same reference signs as those described in the first embodiment and descriptions thereof are omitted in the following description.

In step 201, a beacon signal is periodically transmitted in the communication via the first communication method. As illustrated in FIG. 10, since destinations of the beacon are an unspecified number of other communication terminal devices, the beacon is transmitted by a broadcast (broadcasting) method. The beacon includes ID information such as the SSID of the communication terminal device 30 and may include the position information of the communication terminal device 30 to facilitate the determination of the possibility of the communication on the other communication terminal device side.

In step 202, it is determined whether a response signal of the other communication terminal device has been received. The number of other communication terminal devices from which response signals have been received is not limited to one and is three in the example illustrated in FIG. 10, for example. When one or more other communication terminal devices from which a response signal has been received within a predetermined period of time are present, the beacon transmission is stopped and the operation proceeds to step 203. When the response signal is not received, the beacon transmission is continued.

In step 203, the position information and the content information are acquired from the other communication terminal device. When a plurality of other communication terminal devices is present, the information is acquired by sequentially switching the other communication terminal devices and performing the communication via the first communication method. The acquired information is stored in the storage unit 130.

In step 204, a communication target identification process of selecting a communication terminal device that is a communication target based on the information stored in the storage unit 130 is performed. The communication target identification process is described later.

In step 205, when the communication terminal device that is a communication target and is to be selected is not present, the operation returns to the beacon transmission. When the communication terminal device that is a communication target and is to be selected is present, the operation proceeds to a routine of the connection information exchange/connection information process of the first embodiment illustrated in FIG. 8.

Figure 14:
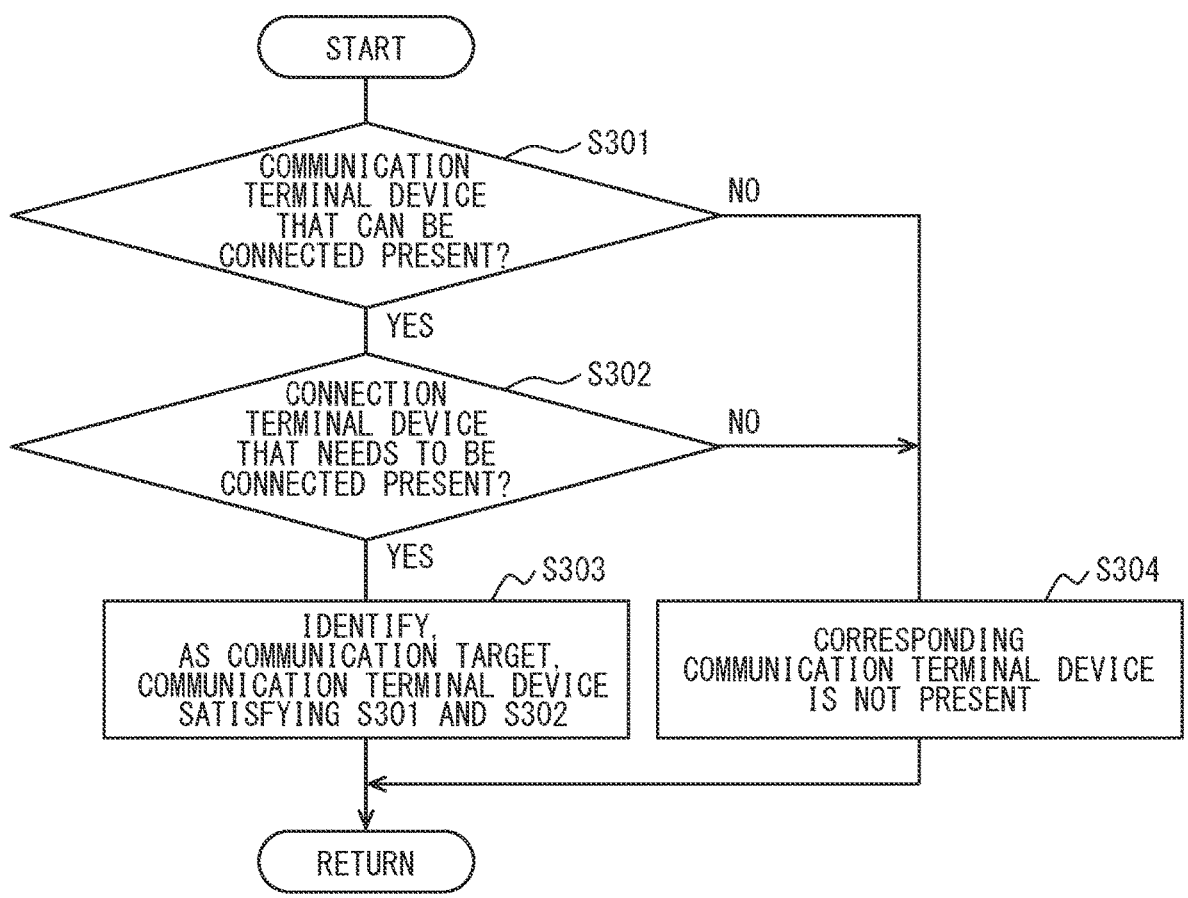
FIG. 14 is a flow diagram illustrating an operation of a communication target identification process by the communication terminal device according to the 2A embodiment of the present disclosure.

The communication target identification process of step 204 is described in more detail with reference to a flowchart of FIG. 14.

In step 301, a relative distance between both of the devices is calculated from an estimated position of the other communication terminal device that is estimated from the position information and is after the elapse of a predetermined period of time, and an estimated position of the communication terminal device 30 that is estimated from the position information and is after the elapse of the predetermined period of time, and whether the distance is equal to or shorter than a predetermined threshold is verified. That is, the possibility of the connection for the communication via the second communication method is determined. As the predetermined threshold, for example, the maximum distance at which the communication via the second communication method is possible or the like is used.

When the other communication terminal device whose relative distance to the communication terminal device 30 is equal to or shorter than the predetermined threshold is present, the operation proceeds to step 302.

In step 302, it is determined whether the other communication terminal device already acquires the contents required by the communication terminal device 30. That is, the need for the connection for the communication via the second communication method is determined. As a result of the verification, when the other communication terminal device has the contents required by the communication terminal device 30, it is determined that there is the need for the connection.

In step 303, the other communication terminal device determined to be able to be connected and determined to need to be connected is identified as a communication terminal device of a communication target.

When a plurality of corresponding other communication terminal devices is present, priorities may be added based on relative distances between the devices and update time and dates of the contents, and a communication terminal device having the highest priority may be selected as the communication terminal device of the communication target.

Information of the other communication terminal devices having the priorities is stored as candidates for selection in the storage unit 130. When communication with the selected communication terminal device of the communication target fails, a candidate to be selected next may be selected as the communication terminal device of the communication target.

In step 304, when the other communication terminal device determined to be able to be connected and determined to need to be connected is not present, it is determined that the communication terminal device of the communication target is not present.

By the above-described operation, the communication terminal device 30 performs the communication target identification process of identifying, from the other communication terminal devices, a communication target with which communication via the second communication method is to be performed, thereby being able to select the optimal communication terminal device as a destination for communication via the second communication method.

(2) 2B Embodiment

Figure 15:
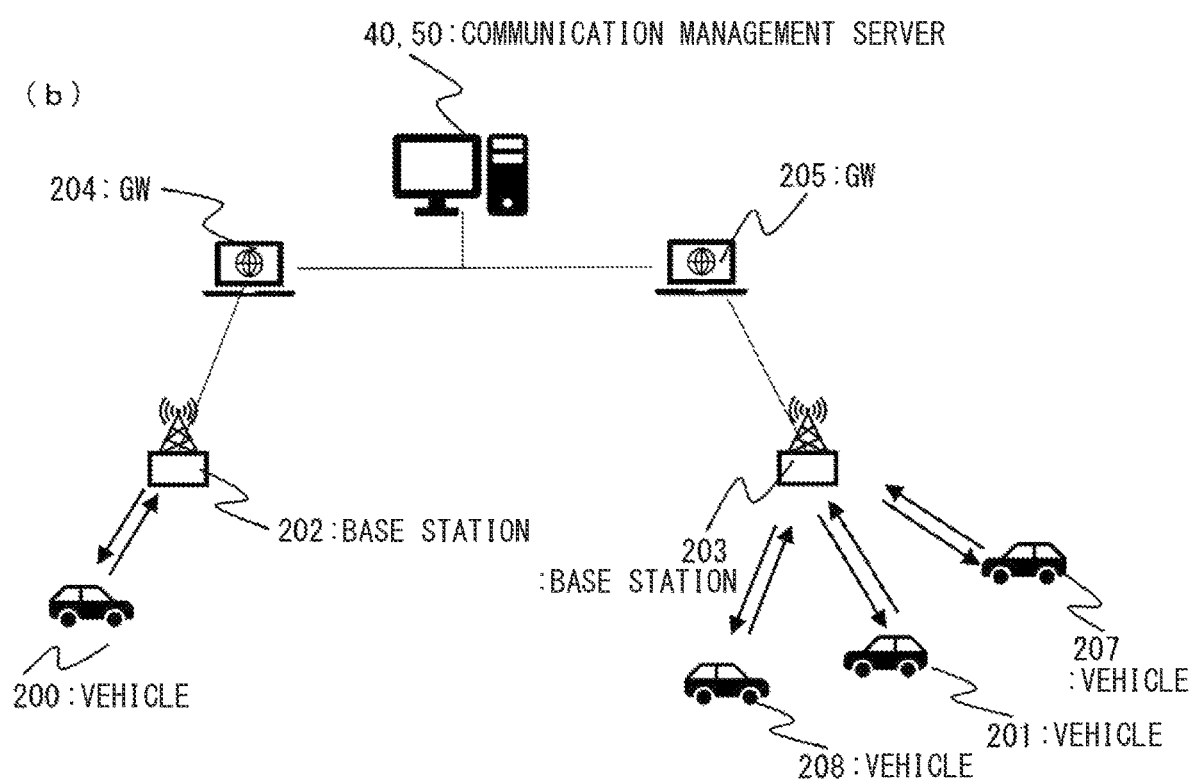
FIG. 15 is an explanatory diagram describing communication via the first communication method by a communication terminal device according to 2B and 2C embodiments of the present disclosure.

In the 2B embodiment, as illustrated in FIG. 15, the vehicle 200 is connected to the Internet via a base station 202 and a GW 204 and connected to the communication management server 40 via the Internet, while the vehicle 201, the vehicle 207, and the vehicle 208 are connected to the Internet via a base station 203 and a GW 205 and connected to the communication management server 40 via the Internet.

As described with reference to (B) of FIG. 9, the vehicle 200 communicates with the communication management server 40 via the first communication method, acquires the position information and content information of the vehicle 201, the vehicle 207, and the vehicle 208 via the communication management server 40, and uses the information to identify a communication target.

While the vehicle 200 directly communicates with the vehicle 201, the vehicle 207, and the vehicle 208 in the 2A embodiment, the vehicle 200 indirectly communicates with the vehicle 201, the vehicle 207, and the vehicle 208 via the communication management server 40 in the 2B embodiment. In terms of this feature, the 2B embodiment is different from the 2A embodiment.

Therefore, the configuration of the communication terminal device according to the present embodiment is the same as that of the communication terminal device 30 according to the 2A embodiment. In addition, an operation after the acquisition of the position information and content information of each of the vehicles in the communication via the first communication method is the same as that of the communication terminal device 30 according to the 2A embodiment. Furthermore, the relay of the communication by the communication management server 40 is already described above with reference to (c) of FIG. 2.

Therefore, regarding the communication terminal device 30 according to the 2B embodiment, an operation to be performed before the acquisition of the position information and content information of each of the vehicles is described.

(a) Operation of Communication Terminal Device According to 2B Embodiment

Figure 16:
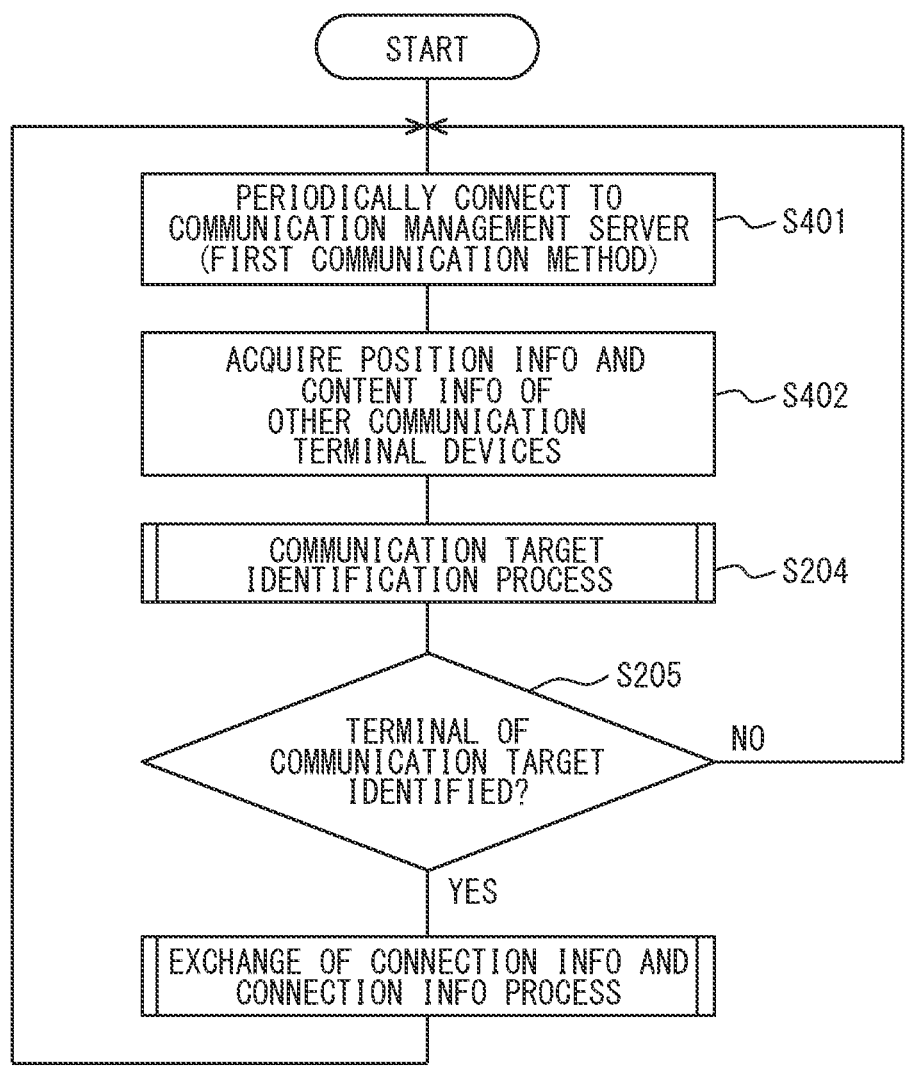
FIG. 16 is a flow diagram illustrating an operation of the communication terminal device according to the 2B embodiment of the present disclosure.

The operation of the communication terminal device 30 according to the 2B embodiment is described with reference to a flowchart of FIG. 16. The same steps as those described in the first embodiment and the 2A embodiment are denoted by the same reference signs as those described in the first embodiment and the 2A embodiment and descriptions thereof are omitted in the following description.

In step 401, the communication terminal device 30 is periodically connected to the communication management server 40 via the first communication method.

In step 402, the communication terminal device 30 requests the communication management server 40 to provide information regarding the other communication terminal devices and acquires the position information and content information of the other communication terminal devices from the communication management server 40. The acquired information is stored in the storage unit 130. The communication management server 40 periodically communicates with the other communication terminal devices and acquires and holds the position information and content information of the other communication terminal devices.

Operations of step 204 and the subsequent steps are the same as the operations of the communication terminal devices 30 according to the 2A embodiment.

The position information and content information of the other communication terminal devices may be periodically transmitted from the communication management server 40 side, regardless of a request from the communication terminal device 30.

In addition, the position information and the content information that are to be transmitted from the communication management server 40 may be narrowed down to the position information and content information of the other communication terminal devices present near the communication terminal device 30 based on the position information of the communication terminal device 30 that is transmitted from the communication terminal device 30, regardless of whether a request is provided from the communication terminal device 30.

By the above-described operation, even when the communication management server relays in the communication via the first communication method, the communication terminal device 30 can identify a communication target device by verifying the possibility of the connection for the communication and the need for the connection for the communication.

(3) 2C Embodiment

In the 2C embodiment, as illustrated in FIG. 15, the communication management server 50 relays communication as in the 2B embodiment. However, in the present embodiment, as described with reference to (C) of FIG. 9, the communication management server 50 acquires the position information and content information of the vehicle 200 and the position information and content information of the vehicle 201, the vehicle 207, and the vehicle 208 and uses the information to identify a vehicle that is a communication target with which the communication terminal device 10 needs to communicate via the second communication method.

In the 2C embodiment, since the communication management server 50 identifies a communication target, the communication target identification unit 343 does not need to be provided on the communication terminal device side, unlike the communication terminal device 30. Therefore, in the present embodiment, the communication terminal device 10 described in the first embodiment is used and the description of the configuration and operation of the communication terminal device 10 will be omitted.

Figure 17:
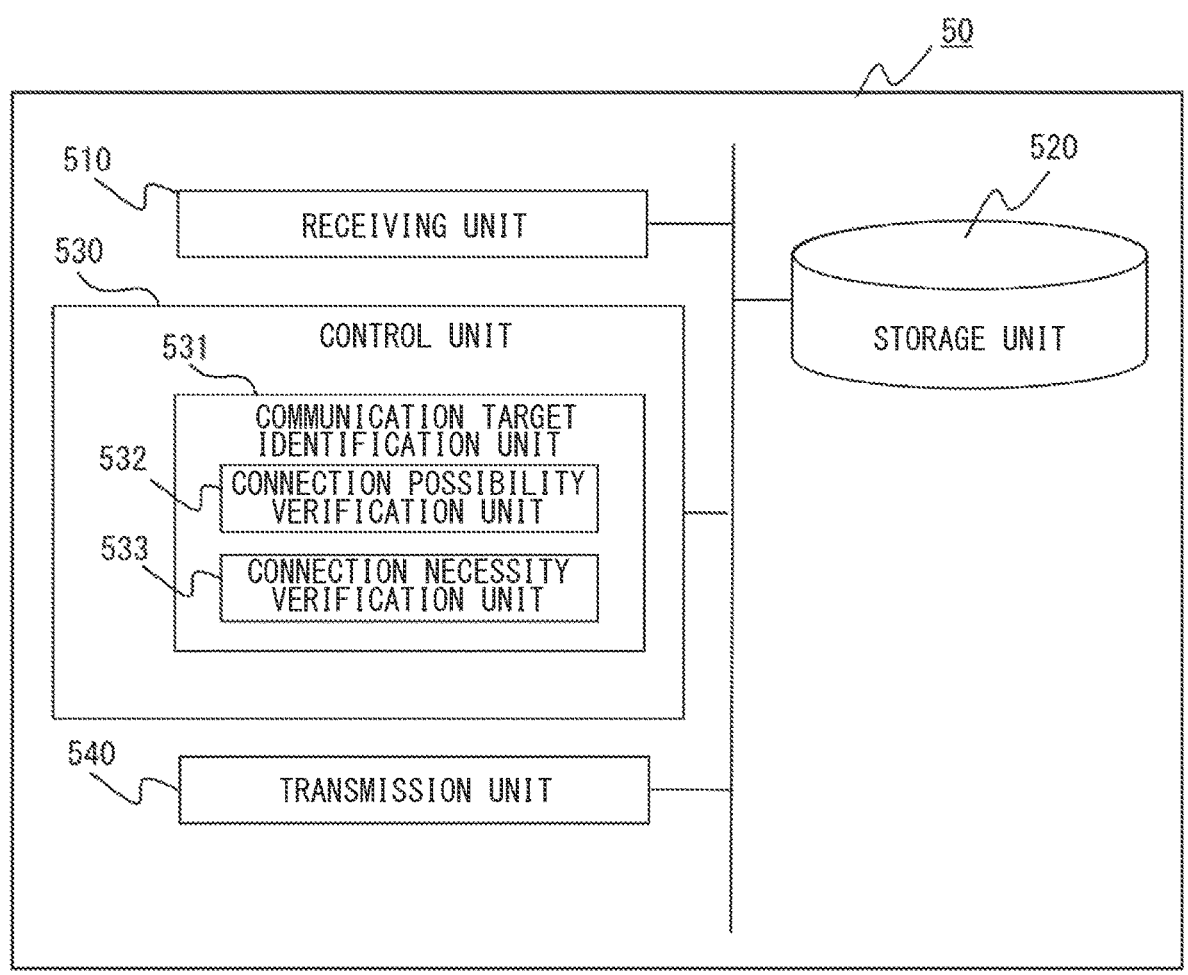
FIG. 17 is a block diagram illustrating a configuration example of a communication management server according to the 2C embodiment of the present disclosure.

(a) Configuration of Communication Management Server 50 According to 2C Embodiment FIG. 17 illustrates the configuration of the communication management server 50 according to the 2C embodiment.

The communication management server 50 includes a receiving unit 510, a storage unit 520, a control unit 530, a transmission unit 540. The control unit 530 includes a communication target identification unit 531.

The receiving unit 510 receives, from the communication terminal device 10 and the other communication terminal devices, the position information indicating the positions of the devices and the content information indicating holding statuses of the contents of the devices. For example, the position information and the content information are the same as those described with reference to FIG. 12.

The storage unit 520 stores the received position information and the received content information.

The control unit 530 controls the receiving unit 510, the storage unit 520, and the transmission unit 540 described later.

The communication target identification unit 531 identifies the other communication terminal device with which the communication terminal device 10 communicates via the second communication method.

In this case, the communication target identification unit 531 includes a connection possibility verification unit 532 and a connection necessity verification unit 533. The connection possibility verification unit 532 verifies, based on the position information of the communication terminal device 10 and the position information of the other communication terminal devices, whether the communication terminal device 10 can be connected to the other communication terminal devices via the second communication method. The connection necessity verification unit 533 verifies, based on the content information of the communication terminal device 10 and the content information of the other communication terminal devices, whether the communication terminal device 10 needs to be connected to the other communication terminal devices.

The communication target identification unit 531 identifies a communication target from the verification results of the connection possibility verification unit 532 and the connection necessity verification unit 533.

Specific details of the verification by the connection possibility verification unit 532 and the connection necessity verification unit 533 are the same as those of the verification by the connection possibility verification unit 344 and the connection necessity verification unit 345 of the communication terminal device 30 according to the 2A embodiment.

In this case, upon receiving a request from the communication terminal device 10, the communication target identification unit 531 may identify the other communication terminal devices with which the communication terminal device 10 communicates via the second communication method. Alternatively, the communication target identification unit 531 may periodically identify the other communication terminal devices that are communication targets, regardless of a request from the communication terminal device 10.

The transmission unit 540 transmits, to the communication terminal device 10, communication target information of the other communication terminal devices identified by the communication target identification unit 531.

The communication terminal device 10 starts to communicate with the other communication terminal devices via the first communication method based on the connection destination information. In the present embodiment, as indicated by (C) in FIG. 9, since the communication management server 50 relays the communication, the control unit 530 controls the receiving unit 510 and the transmission unit 540 and relays transmission and reception between the communication terminal device 10 and the other communication terminal devices that are connection destinations.

Since the communication management server 50 relays the communication, a detailed address and ID of the communication target side are not necessarily required, like the communication management server 40 according to the first embodiment, and information associated with a local ID presented by the server may be used.

With the above-described configuration, the communication management server 50 verifies the possibility of the connection for the communication and the need for the connection for the communication and identifies a communication target. Therefore, the communication terminal device 10 does not need to identify a communication target and it is possible to reduce a process load.

In addition, it is possible to identify a communication terminal device of a communication target and perform communication while avoiding disclosing and acquiring a private address and ID information as much as possible.

Figure 18:
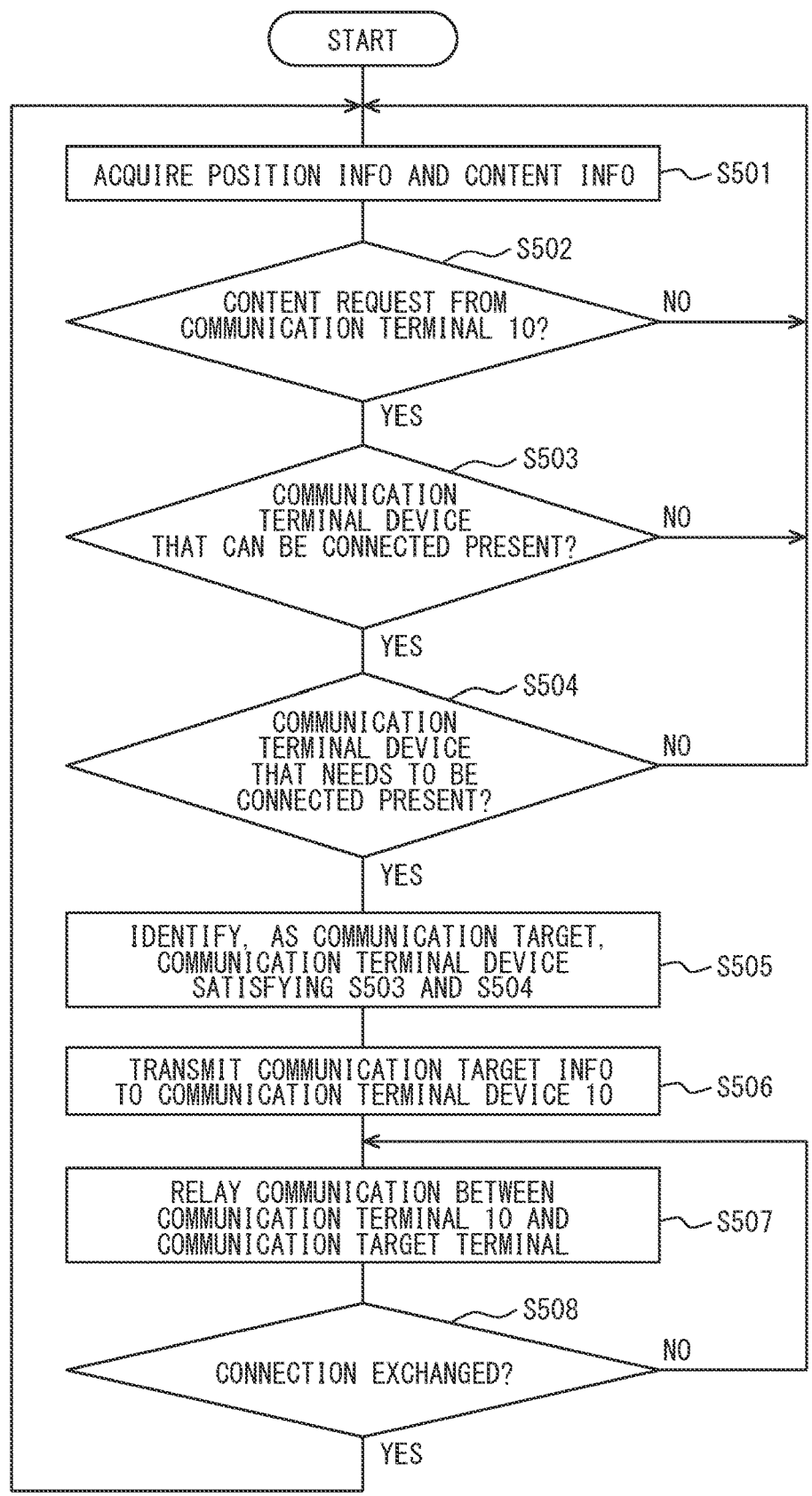
FIG. 18 is a flow diagram illustrating an operation of the communication management server according to the 2C embodiment of the present disclosure.

(b) Operation of Communication Management Server 50 According to 2C Embodiment An operation of the communication management server 50 according to the 2C embodiment is described with reference to a flowchart of FIG. 18.

In step 501, the communication management server 50 periodically acquires the position information and the content information from the communication terminal device 10 and the other communication terminal devices.

In step 502, the communication management server 50 determines whether a request for contents has been provided from the communication terminal device 10. When the content information has been transmitted from the communication terminal device 10, the operation proceeds to step 503.

In step 503, the communication management server 50 verifies, based on the position information, the possibility of the connection between the communication terminal device 10 and the other communication terminal devices and verifies whether the other communication terminal device that can be connected is present. The specific method is the same as the communication target identification process according to the 2A embodiment.

In step 504, the communication management server 50 verifies whether the other communication terminal device to which the communication terminal device 10 needs to be connected is present. The specific method is the same as the communication target identification process according to the 2A embodiment.

In step 505, when the other communication terminal device that can be connected and needs to be connected is present, the communication management server 50 identifies the other communication terminal device as a communication target.

In step 506, the communication management server 50 transmits, to the communication terminal device 10, communication target information that is information identifying the communication terminal device of the communication target.

In step 507, the communication management server 50 relays the communication between the communication terminal device 10 and the communication terminal device of the communication target via the first communication method.

The communication terminal device 10 communicates with the communication terminal device of the communication target via the first communication method, thereby exchanging connection information necessary to start to communicate with the communication terminal device of the communication target via the second communication method.

In step 508, when the exchange of the connection information between the communication terminal device 10 and the communication terminal device of the communication target is ended, the communication via the first communication method is ended.

Step 507 and step 508 are arbitrary steps in the present embodiment. That is, the communication management server 50 may be a device dedicated to identify a communication target.

By the above-described operation, the communication management server 50 identifies the other communication terminal device with which the communication terminal device 10 needs to communicate via the second communication method. Therefore, the communication terminal device 10 does not need to identify a communication target and it is possible to reduce the process load.

3. Others, Modifications and Applications of Each Embodiment (1) In Case where Other Communication Terminal Device is Mounted on Fixed Object In the first embodiment, either the communication terminal device 10 or the other communication terminal device may be mounted on a fixed object. However, in the second embodiment, either the communication terminal device 30 or the other communication terminal device may be mounted on a fixed object.

Figure 19:
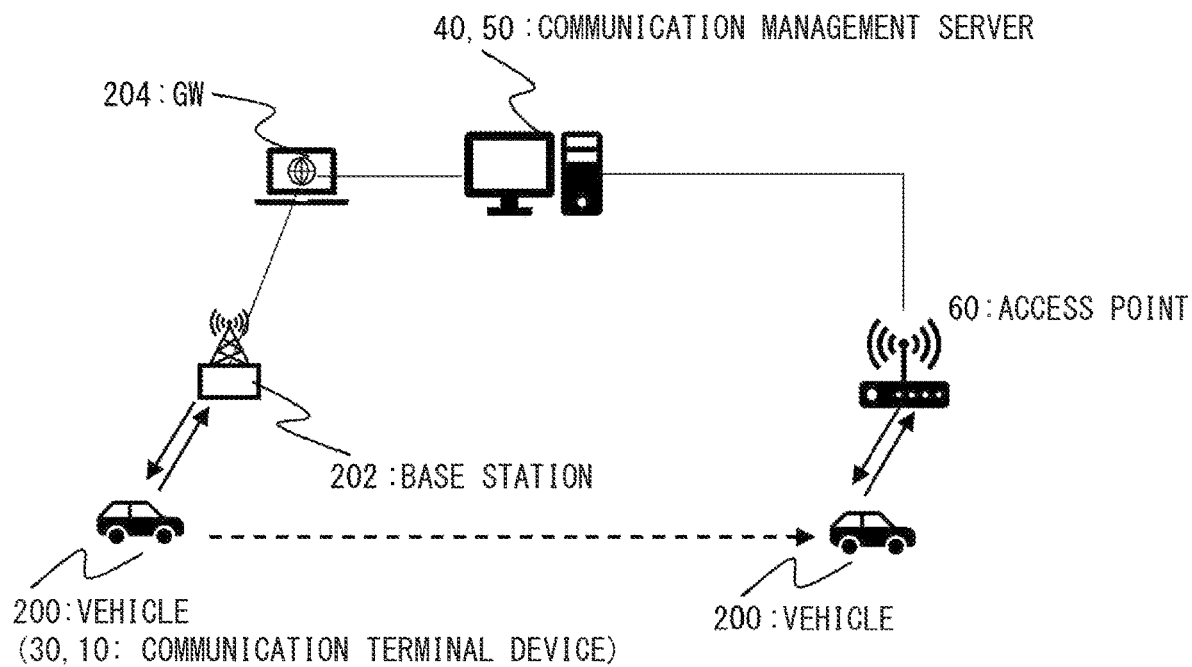
FIG. 19 is an explanatory diagram illustrating a case where another communication terminal device according to each of the embodiments of the present disclosure is an access point.

FIG. 19 illustrates an example in which one of the other communication terminal devices is an access point 60.

The access point 60 is connected to the communication management server 50 via the Internet. For example, the access point 60 includes a Wi-Fi (registered trademark) station installed in a shop, a restaurant, a public facility, or the like, and a station for a HotSpot (registered trademark) service.

Even when the other communication terminal device is the access point 60, a technique for identifying a communication target that needs to perform communication via the second communication method is applicable, and in particular, it is possible to use the 2B embodiment and the 2C embodiment.

When the 2C embodiment is taken as an example, the communication management server 50 manages a plurality of access points in advance and recognizes the position and content information of each of the access points.

When the communication terminal device 10 transmits the position information of the communication terminal device 10 and content information of required contents to the communication management server 50, the communication management server 50 identifies the access point 60 from the plurality of access points based on the position information of the communication terminal device 10 and the required contents.

After the access point 60 is identified, the communication terminal device 10 and the access point 60 start to communicate with each other via the first communication method, but the communication management server 50 may relay the communication or the communication management server 50 may not relay the communication and the communication terminal device 30 and the access point 60 may directly communicate with each other via the Internet.

A communication target may not be identified by the communication management server 50 and may be identified by a server of a management company that manages the access point 60, or both of the servers may coordinate with each other. A configuration for the identification is not limited.

For example, the communication management server 50 needs to periodically acquire the position information from the moving communication terminal device 10. However, since the access point 60 does not move, position information and content information may be acquired only once or irregularly acquired from the server of the management company.

In addition, since the access point 60 is the group owner in general, information of the GON among connection information necessary for the second communication unit 110 of the communication terminal device 30 to start to communicate with the other communication terminal devices may not be exchanged.

(2) In Case Where Communication Terminal Device is Mounted on Fixed Object

Figure 20:
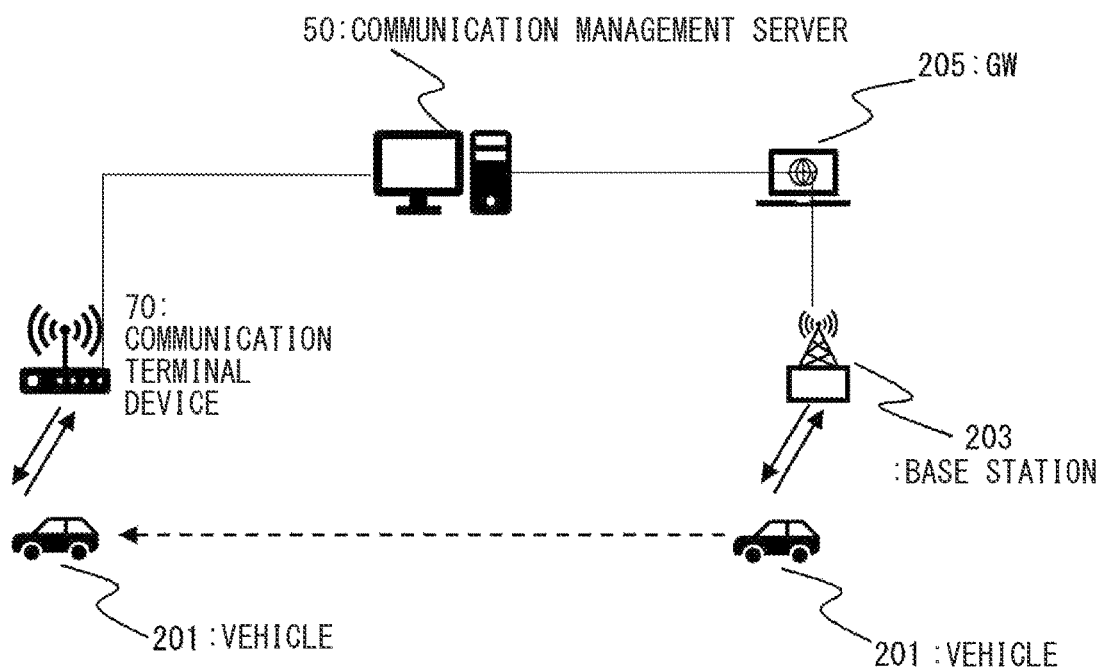
FIG. 20 is an explanatory diagram illustrating a case where the communication terminal device according to each of the embodiments of the present disclosure is an access point.

As illustrated in FIG. 20, a communication terminal device 70 that is an own device may be mounted on a fixed object. In FIG. 20, the communication terminal device 70 is an access point for a wireless LAN. The communication terminal device 70 is connected to the communication management server 50 via the Internet.

Even when the communication terminal device 70 is the access point, a technique for identifying a communication target that needs to perform communication via the second communication method is applicable, as in the second embodiment.

Since the communication terminal device 70 is a group owner in general, information of the GON among the connection information necessary for the second communication unit 110 of the communication terminal device 70 to start to communicate with the other communication terminal device may not be exchanged.

(3) Regarding GON

Although the process of the GON described in the first embodiment is to determine whether the communication terminal device 30 or the other communication terminal device becomes the group owner in the communication via the second communication method, a method therefor is arbitrary.

For example, in the communication via the first communication method, when each of the communication terminal device 30 and the other communication terminal device communicates with an unspecified number of communication terminal devices during a certain predetermined period of time, either the communication terminal device 30 or the other communication terminal device that communicates with a larger number of communication terminal devices within the predetermined period of time may be the group owner.

Alternatively, either the communication terminal device 30 or the other communication terminal device that has a larger number of contents may be the group owner.

Alternatively, the communication management server 50 may recognize the positions of communication terminal devices other than the communication terminal device 30 and the other communication terminal device, and either the communication terminal device 30 or the other communication terminal device that is located near a larger number of communication terminal devices may be the group owner.

(4) Regarding Communication Target Identification Unit

In FIG. 11, the communication target identification unit 343 identifies, from the verification results of the connection possibility verification unit 344 and the connection necessity verification unit 345, a communication target that performs communication via the second communication method, but the communication target identification unit 343 may identify a communication target only based on the verification results of the connection possibility verification unit 344. In this case, for example, at the beginning of the communication via the second communication method, the need for the connection is determined based on the content information and it is determined whether the communication via the second communication method is continued.

In particular, in the communication via the first communication method, when wireless communication is performed with an unspecified number of other communication terminal devices, it is effective for a case where the amount of private information to be transmitted and received needs to be minimized, or the like.

Alternatively, a communication target may be identified only based on the verification results of the connection necessity verification unit 345. In this case, for example, the need for the connection is determined for a communication target directly connected via the first communication method and it is determined whether the communication via the second communication method is started.

(5) Regarding Communication Via Second Communication Method

When the communication via the second communication method is, for example, a wireless LAN, communication within a group constituted by a plurality of communication terminal devices is possible. For example, when vehicles in traffic congestion form a group, it is possible to share contents such as road congestion information.

When a new vehicle joins this group, information of a master device that is a current group owner may be acquired in the communication via the first communication method. With this configuration, it is possible to simplify or prevent the exchange of the connection information for the GON.

(6) Regarding Exchange of Connection Information and Connection Process

Figure 8:
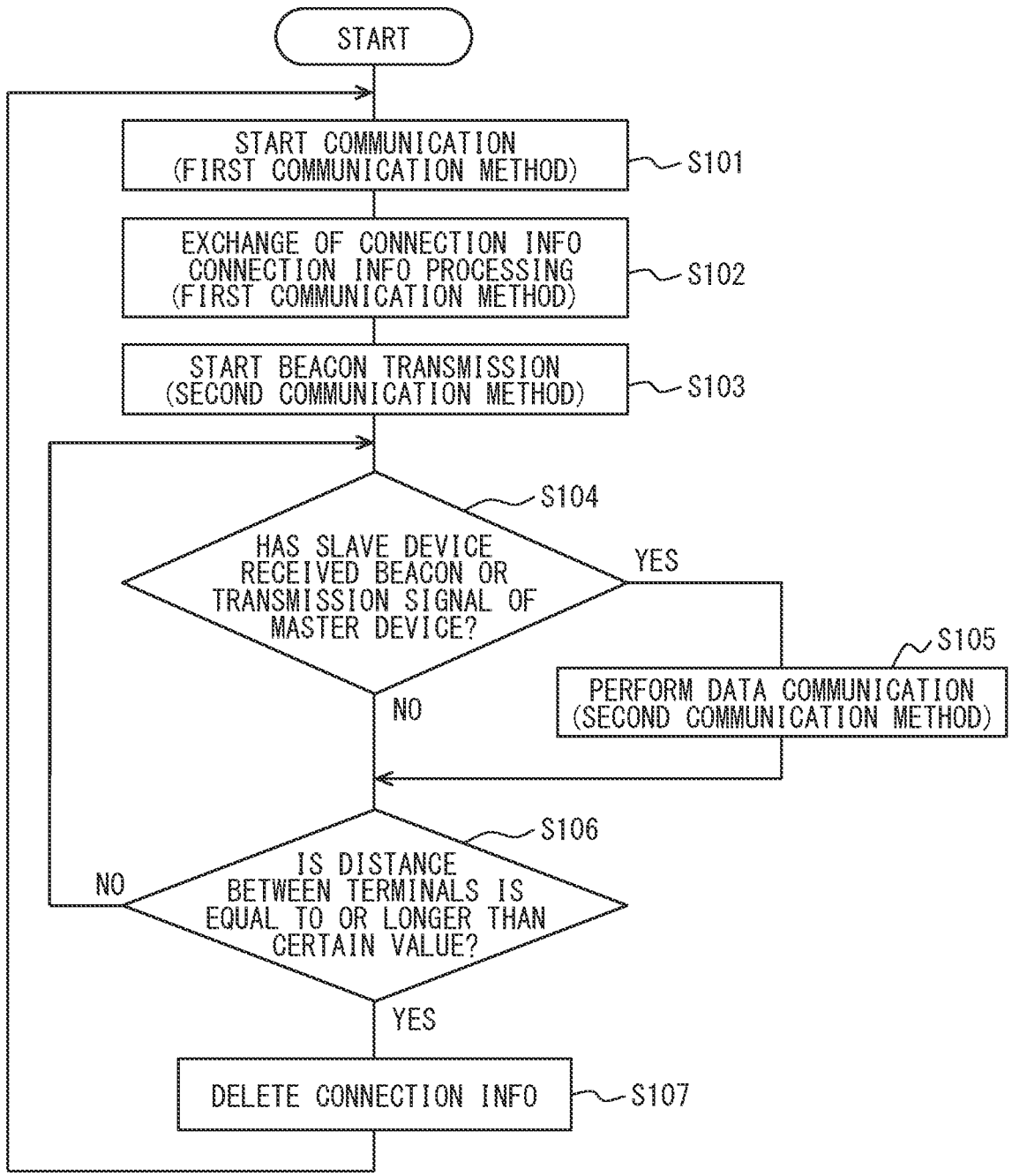
FIG. 8 is a flow diagram illustrating an operation of the communication terminal device according to the first embodiment of the present disclosure.

For example, as indicated by step 102 illustrated in FIG. 8, the communication terminal device 30 exchanges the connection information necessary to perform the communication via the second communication method during the communication via the first communication method, and performs the connection information process such as the authentication process, the connection process, and the IP address acquisition process based on the connection information. In this case, a period of time that elapses until the communication via the second communication method becomes possible may be estimated from the position information of the communication terminal device 30 and the position information of the other communication terminal devices, and details of the exchange of the connection information and the connection information process may be adjusted such that the process is ended within the estimated period of time. For example, when the period of time that elapses until the communication via the second communication method becomes possible is very short, only the authentication process and the connection process are performed during the time when the communication via the first communication method is continued, and the IP address acquisition process may be performed after the communication via the second communication method becomes possible.

4. General Overview

The features such as the communication terminal devices according to each embodiment of the present disclosure are described above.

Since the terms used in each embodiment are examples, the terms may be replaced with synonymous terms or terms indicating synonymous functions.

Each of the block diagrams used for the explanation of the embodiments is a diagram in which the configuration of the device is classified and organized into the functions. The blocks indicating the functions are implemented by an arbitrary combination of hardware and software. In addition, since the blocks indicate the functions, the block diagrams can be recognized as the disclosure of the invention of a method and the disclosure of the invention of a program for implementing the method.

The order of the blocks that can be recognized as the processes, the flows, and the methods described in each embodiment may be changed unless there is a constraint such as a relationship in which one step uses a result of another step at the previous stage thereof.

The terms first, second, and N-th (N is an integer) used in each embodiment and the claims are used to distinguish two or more configurations of the same type and two or more methods of the same type and do not limit the order and superiority and inferiority.

Although each embodiment is premised on the communication terminal devices mounted on the vehicles, the present disclosure includes dedicated or general-purpose communication terminal devices other than communication terminal devices for vehicles, unless otherwise limited in the claims.

Although each embodiment is premised on the communication terminal devices mounted on the vehicles, the communication terminal devices may be communication terminal devices held in pedestrians.

In addition, examples of the form of the communication terminal device according to the present invention are as follows.

Examples of the forms of parts are a semiconductor element, an electronic circuit, a module, and a microcomputer.

Examples of the form of a semi-finished product are an ECU (electric control unit) and a system board.

Examples of the form of a finished product are a mobile phone, a smartphone, a tablet, a personal computer (PC), a workstation, and a server.

In addition, a device having a communication function and the like are included, and examples are a video camera, a still camera, and a car navigation system.

It is assumed that a communication management server device according to the present invention is used for the purpose of providing various services. With the provision of the services, the communication management server device according to the present invention is used, the method according to the present invention is used, and/or the program according to the present invention is executed.

In addition, the present invention can be implemented by not only dedicated hardware having the configurations and functions described in each embodiment but also as a combination of a program recorded in a recording medium such as a memory or a hard disk and provided to implement the present invention, and general-purpose hardware having a dedicated or general-purpose CPU, which can execute the program, and having a memory and the like.

The program stored in a non-transitory substantive recording medium (for example, an external storage device (hard disk, USB memory, CD/BD, or the like) of dedicated or general-purpose hardware or an internal storage device (RAM, ROM, or the like)) can be provided to dedicated or general-purpose hardware via a recording medium or via a communication line from a server without the intermediary of a recording medium. This makes it possible to provide the latest functions via the upgrade of the program at any time.

INDUSTRIAL APPLICABILITY

Although the communication terminal device according to the present disclosure is described as a communication terminal device that is mainly used in a communication system for a vehicle, the communication terminal device according to the present disclosure is not limited to a communication terminal device for a vehicle and is applicable to a communication terminal device that is used for various purposes, for example, for a mobile phone, a tablet, and a game machine.

The invention claimed is:

1. A communication terminal device, comprising:
   a first transceiver configured to communicate with another communication terminal device by a first communication method;
   a second transceiver configured to communicate with the other communication terminal device by a second communication method that is different from the first communication method, the first transceiver being configured to exchange connection information necessary for the second transceiver to start communication with the other communication terminal device before the second transceiver starts the communication;
   a control unit configured to control the first transceiver and the second transceiver; and
   a connection information processing unit configured to use the connection information to perform connection information processing for communication by the second communication method before the communication by the second communication method starts;
wherein the second communication method is a wireless LAN.

2. The communication terminal device according to claim 1, wherein
a communication distance by the first communication method is longer than a communication distance by the second communication method.

3. The communication terminal device according to claim 1, wherein
the wireless LAN is a wireless communication method in conformity with the communication standard IEEE802.11.

4. The communication terminal device according to claim 1, wherein
the communication terminal device is mounted in a mobile body.

5. The communication terminal device according to claim 1, wherein
the communication terminal device is mounted in a fixed object.

6. The communication terminal device according to claim 4, wherein
the other communication terminal device is mounted in a fixed object.

7. The communication terminal device according to claim 4, wherein
the other communication terminal device is mounted in a mobile body.

8. The communication terminal device according to claim 1, wherein
the connection information is authentication information.

9. The communication terminal device according to claim 1, wherein
the connection information is information for determining whether either the communication terminal device or the other communication terminal device is a group owner.

10. The communication terminal device according to claim 1, wherein
the connection information is information that is transmitted and received by a DHCP (Dynamic Host Configuration Protocol).

11. The communication terminal device according to claim 1, wherein:
the control unit is configured to instruct the connection information processing unit to exchange the connection information via the first transceiver.

12. The communication terminal device according to claim 1, further comprising:
a communication target identification unit that is configured to identify the other communication terminal device that performs communication by the second communication method, wherein
the first transceiver is configured to receive position information indicating a position of the other communication terminal device and content information indicating a holding status of contents of the other communication terminal device, and
the communication target identification unit includes:
a connection possibility verification unit that is configured to verify, based on the position information, whether connection to the other communication terminal device by the second communication method is possible; and
a connection necessity verification unit that is configured to verify, based on the content information, whether the connection to the other communication terminal device is necessary.

13. The communication terminal device according to claim 12, wherein
the connection possibility verification unit is further configured to verify, based on position information of the communication terminal device, whether the connection to the other communication terminal device by the second communication method is possible.

14. A communication method, comprising the steps of:
starting communication with another communication terminal device by a first communication method;
exchanging, by the first communication method, connection information necessary to start communication by a second communication method that is different from the first communication method;
performing connection information processing using the connection information and starting communication with the other communication terminal device by the second communication method; and
using the connection information to perform connection information processing for communication by the second communication method before the communication by the second communication method starts;
wherein the second communication method is a wireless LAN.

15. A non-transitory computer readable storage medium storing a communication program comprising instructions that, when executed by a communication terminal device, cause the communication terminal device to:
start communication with another communication terminal device by a first communication method;
exchange, by the first communication method, connection information necessary to start communication by a second communication method that is different from the first communication method;
perform connection information processing using the connection information and start the communication with the other communication terminal device by the second communication method; and
use the connection information to perform connection information processing for communication by the second communication method before the communication by the second communication method starts;
wherein the second communication method is a wireless LAN.

* * * * *